United States Patent
Kanda

(10) Patent No.: US 9,529,177 B2
(45) Date of Patent: Dec. 27, 2016

(54) IMAGING LENS AND IMAGING APPARATUS EQUIPPED WITH THE IMAGING LENS

(71) Applicant: FUJIFILM Corporation, Tokyo (JP)

(72) Inventor: Hideo Kanda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 14/613,392

(22) Filed: Feb. 4, 2015

(65) Prior Publication Data

US 2015/0226939 A1    Aug. 13, 2015

(30) Foreign Application Priority Data

Feb. 7, 2014 (JP) .................................. 2014-022391
Mar. 4, 2014 (JP) .................................. 2014-041702

(51) Int. Cl.
G02B 13/00 (2006.01)
G02B 9/60 (2006.01)

(52) U.S. Cl.
CPC ............. *G02B 13/0045* (2013.01); *G02B 9/60* (2013.01)

(58) Field of Classification Search
CPC ......... G02B 13/0045; G02B 9/60; G02B 9/62; G02B 9/64; G02B 13/02
USPC ................ 359/660, 658, 659, 657, 713, 714
See application file for complete search history.

(56) References Cited

U.S. PATENT DOCUMENTS

| 8,379,325 B2 | 2/2013 | Tsai et al. |
| 8,547,649 B2 | 10/2013 | Lai |
| 2013/0021678 A1* | 1/2013 | Tsai .................... G02B 13/0045 359/714 |

* cited by examiner

*Primary Examiner* — Darryl J Collins
*Assistant Examiner* — Journey Sumlar
(74) *Attorney, Agent, or Firm* — Young & Thompson

(57) ABSTRACT

An imaging lens is essentially constituted by five lenses, including: a first lens having a positive refractive power and a convex surface toward the object side; a second lens of a biconcave shape; a third lens having a positive refractive power and is of a meniscus shape with a concave surface toward the object side; a fourth lens having a negative refractive power and a concave surface toward the object side; and a fifth lens having a negative refractive power and a concave surface toward the image side, provided in this order from the object side. The imaging lens satisfies predetermined conditional formulae.

19 Claims, 14 Drawing Sheets

IMAGING LENS AND IMAGING APPARATUS EQUIPPED WITH THE IMAGING LENS

CROSS REFERENCE TO RELATED APPLICATIONS

The present application claims priority under 35 U.S.C. §119 to Japanese Patent Application No. 2014-022391 filed on Feb. 7, 2014 and Japanese Patent Application No. 2014-041702 filed on Mar. 4, 2014. Each of the above applications is hereby expressly incorporated by reference in its entirety into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

BACKGROUND ART

Accompanying the recent spread of personal computers in households, digital still cameras capable of inputting image data such as photographed scenes and portraits into personal computers are rapidly becoming available, in addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. For example, U.S. Pat. Nos. 8,679,325 and 8,547,649 disclose lens systems having five lens configurations, constituted by: a first lens having a positive refractive power, a second lens having a negative refractive power, a third lens having a positive refractive power, a fourth lens having a negative refractive power, and a fifth lens having a negative refractive power.

DISCLOSURE OF THE INVENTION

Meanwhile, there is demand for wider angles of view in addition to demand for shorter total lengths, in imaging lenses having comparatively short total lengths such as those for use in smart phones, tablet terminals, and the like.

However, it is difficult for the lens systems disclosed in U.S. Pat. Nos. 8,679,325 and 8,547,649 to meet both the demand for a shorter total length and a wider angle of view, while maintaining the focal lengths thereof. In addition, a further shortening of the total length is desired for the lens system disclosed in U.S. Pat. No. 8,547,649.

The present invention has been developed in view of the foregoing points. The object of the present invention is to provide an imaging lens that can achieve a widening of the angle of view while realizing as shortening of the total length and high imaging performance from a central angle of view to peripheral angles of view. It is another object of the present invention to provide an imaging apparatus equipped with the lens, which is capable of obtaining high resolution photographed images.

An imaging lens of the present invention consists essentially of five lenses, including:

a first lens having a positive refractive power and a convex surface toward the object side;

a second lens of a biconcave shape;

a third lens having a positive refractive power and is of a meniscus shape with a concave surface toward the object side;

a fourth lens having a negative refractive power and a concave surface toward the object side; and as fifth lens having a negative refractive power and a concave surface toward the image side, provided in this order from the object side;

the imaging lens satisfying the following conditional formulae:

$$-1.2 < f/f4 < -0.2 \tag{1}$$

$$-1.18 < f/f5 < -0.35 \tag{2}$$

wherein f the focal length of the entire system, f4 is the focal length of the fourth lens, and f5 is the focal length of the fifth lens.

The optical performance of the imaging lens of the present invention can he further improved by adopting the following favorable configurations.

It is preferable for the fifth lens to be of as biconcave shape in the imaging lens of the present invention.

It is preferable for the first lens to be of a biconvex shape in the imaging lens of the present invention.

It is preferable for the fourth lens to be of a biconcave shape in the imaging lens of the present invention.

It is preferable or the imaging lens of the present invention to satisfy one or arbitrary combinations of Conditional Formulae (1-1) and (1-2), Conditional Formulae (2-1), (2-2), (3) through (3-2), (4) though (4-2), (5) through (5-2 and (7) below.

$$-1 < f/f4 < -0.25 \tag{1-1}$$

$$-0.85 < f/f4 < -0.3 \tag{1-2}$$

$$-1.17 < f/f5 < -0.44 \; (2\text{-}1)$$

$$-1.1 < f/f5 < -0.7 \tag{2-2}$$

$$1.5 < f \cdot P34 < 5 \tag{3}$$

$$1.6 < f \cdot P34 < 4 \tag{3-1}$$

$$2.4 < f \cdot P34 < 3 \tag{3-2}$$

$$-2 < f \cdot P45 < 1.1 \tag{4}$$

$$-1.5 < f \cdot P45 < 0 \tag{4-1}$$

$$-1.2 < f \cdot P45 < -0.5 \tag{4-2}$$

$$0.08 < (L2r + L2f)/(L2r - L2f) < 1 \tag{5}$$

$$0.09 < (L2r + L2f)/(L2r - L2f) < 0.99 \tag{5-1}$$

$$0.1<(L2r+L2f)/(L2r-L2f)<0.985 \quad (5\text{-}2)$$

$$0<f\cdot\tan\omega/L5r<0.7 \quad (6)$$

$$1<f/f1<3 \quad (7)$$

wherein f is the focal length of the entire system, f1 is the focal length of the first lens, f4 is the focal length of the fourth lens, f5 is the focal length of the fifth lens, L2r is the paraxial radius of curvature of the surface of the second lens toward the image side, L2f is the paraxial radius of curvature of the surface of the second lens toward the object side, L5r is the paraxial radius of curvature of the surface of the fifth lens toward the object side, ω is the half value of a maximum angle of view when focused on an object at infinity, P34 is the refractive power of an air lens formed between the surface of the third lens toward the image side and the surface of the fourth lens toward the object side, the refractive power of the air lens being obtained by Formula (P1) below, and P45 is the refractive power of an air lens formed between the surface of the fourth lens toward the image side and the surface of the fifth lens toward the object side, the refractive power of the air lens being obtained by Formula (P2) below:

$$P34 = \frac{1-Nd3}{L3r} + \frac{Nd4-1}{L4f} - \frac{(1-Nd3)\times(Nd4-1)\times D7}{L3r\times L4f} \quad (P1)$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis, $$P45 = \frac{1-Nd4}{L4r} + \frac{Nd5-1}{L5f} - \frac{(1-Nd4)\times(Nd5-1)\times D9}{L4r\times L5f} \quad (P2)$$

wherein Nd4 is the refractive index of the fourth lens with respect to the d Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

Note that in the imaging lens of the present invention, the expression "consists essentially of five lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the five lenses.

Note that the shapes of the surfaces and the signs of the refractive powers of the lenses will be considered in the paraxial region for those that include aspherical surfaces. In addition, the signs of the radii of curvature are positive for surface shapes having convex surfaces toward the object side, and negative for surface shapes having convex surfaces toward the image side.

An imaging apparatus of the present invention is equipped with the imaging lens of the present invention.

According to the imaging lens of the present invention, the configuration of each lens element is optimized within a lens configuration having five lenses as a whole, and the configurations of the first lens through the fifth lens are favorably configured in particular. Therefore, a lens system, which is compatible with a greater number of pixels, that can achieve a shortening of the total length and a widening of the angle of view, and that realizes high imaging performance from a central angle of view to peripheral angles of view can be realized.

The imaging apparatus of the present invention is equipped with the imaging lens of the present invention. Therefore, the imaging apparatus of the present invention is capable of shortening the apparatus size in the direction of the optical axis of the imaging lens and of obtaining high resolution photographed images.

BEST MODE FOR CARRYING OUT THE INVENTION

Hereinafter, embodiments of the present invention will be described in detail with reference to the attached drawings.

Figure 1:
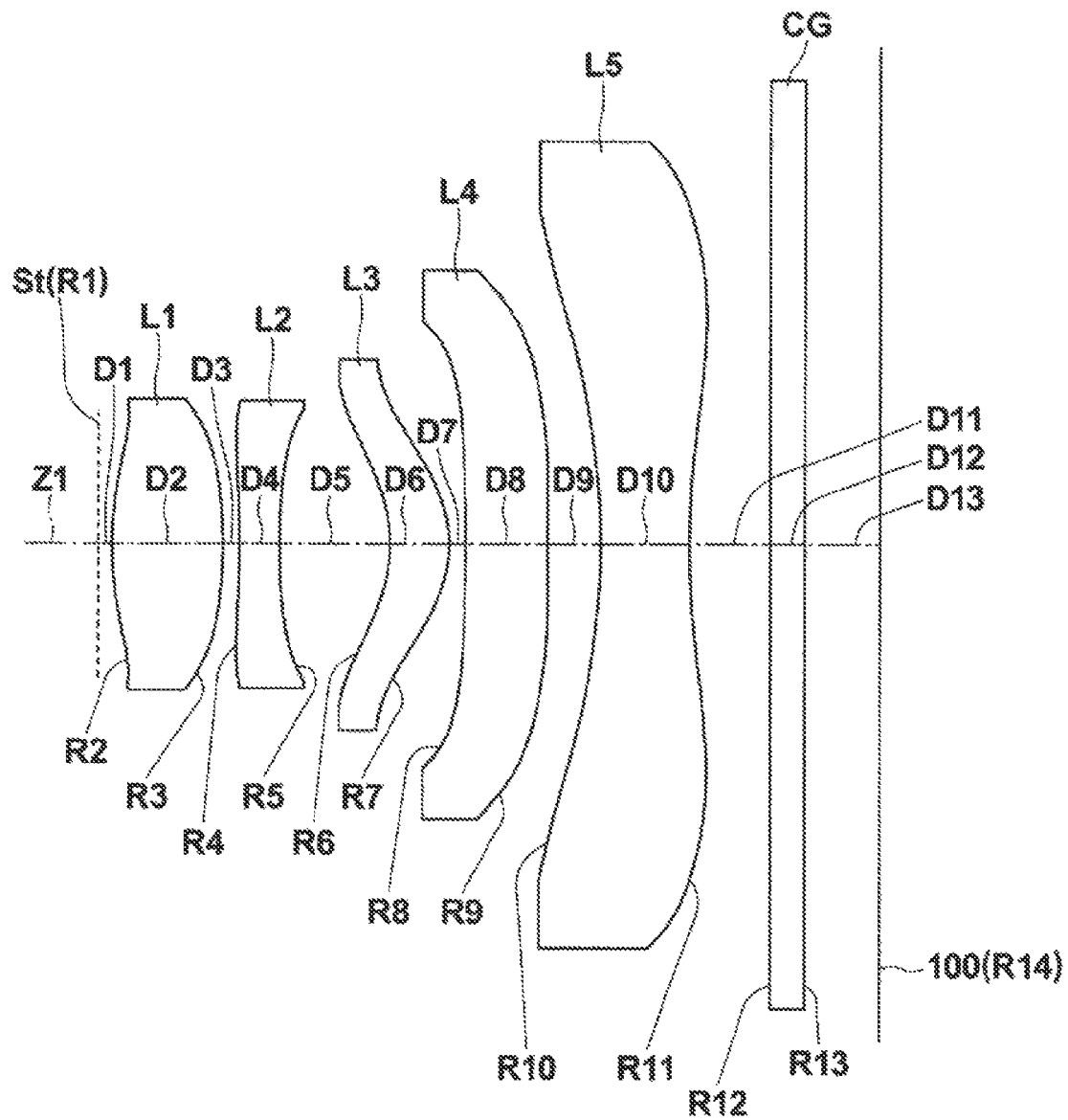
FIG. 1 is a sectional diagram that illustrates a first example of the configuration of an imaging lens according to an embodiment of the present invention, and corresponds to a lens of Example 1.
Figure 2:
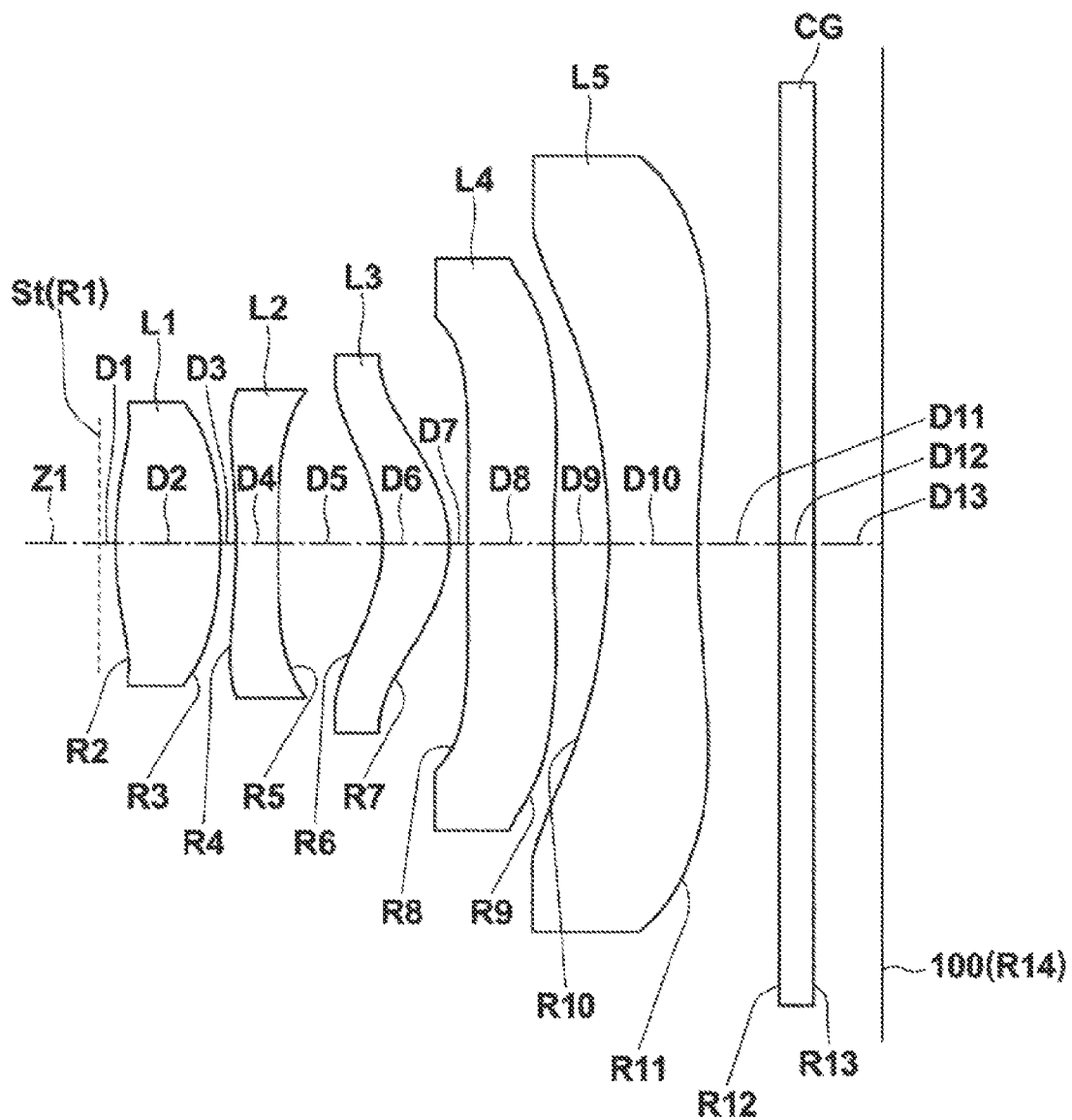
FIG. 2 is a sectional diagram that illustrates a second example of the configuration of an imaging lens according to an embodiment of the present invention, and corresponds to a lens of Example 2.

FIG. 1 illustrates a first example of the configuration of an imaging lens according to an embodiment of the present invention. This example corresponds to the lens configuration of Numerical Example 1 (Table 1 and Table 2), to be described later.

Figure 6:
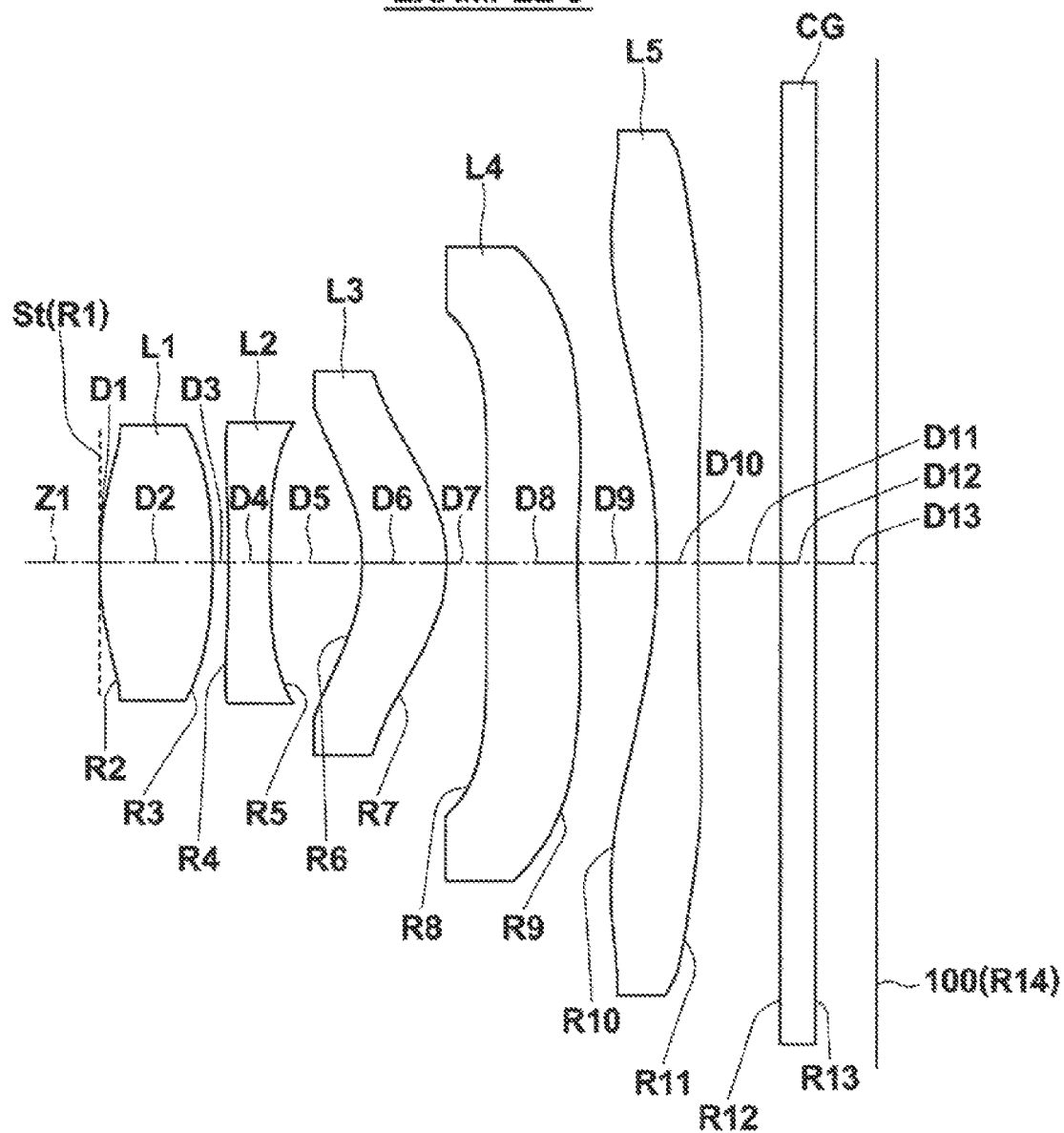
FIG. 6 is a sectional diagram that illustrates a sixth example of the configuration of an imaging lens according to an embodiment of the present invention, and corresponds to a lens of Example 6.
Figure 7:
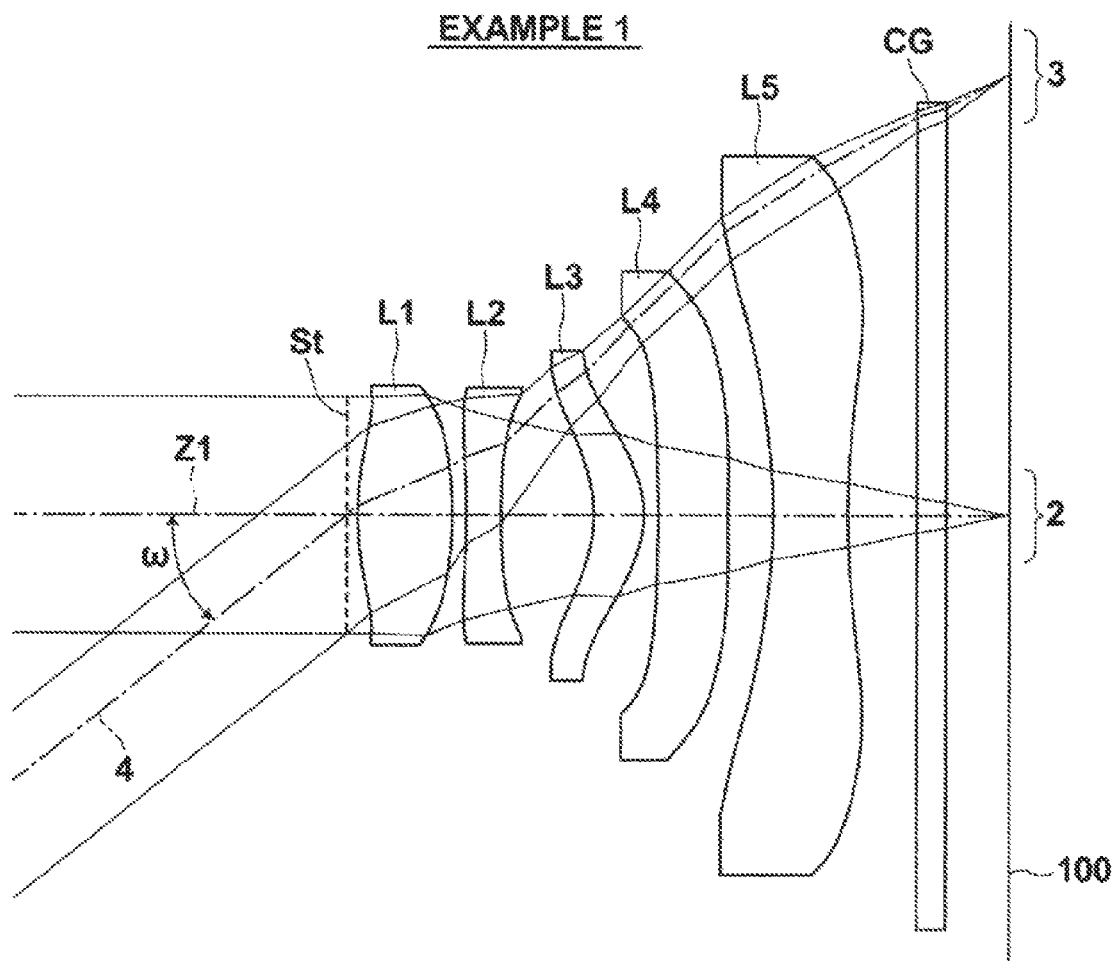
FIG. 7 is a diagram that illustrates the paths of light rays that pass through the imaging lens of FIG. 1.

FIG. 2 through FIG. 6 are sectional diagrams that illustrate second through sixth examples of lens configurations that correspond to Numerical Examples 2 through 6 (Table 3 through Table 12). In FIGS. 1 through 6, the symbol Ri represents the radii of curvature of ith surfaces, i being lens surface numbers that sequentially increase toward the image side, with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 6 will also be described as necessary. In addition, FIG. 7 is a diagram that illustrates the paths of light rays that pass through the imaging lens of FIG. 1. FIG. 6 illustrates the paths of an axial light beam 2 and a maximum angle of view light beam 3 in a state focused on an object at a distance of infinity, as well as a half value ω of a maximum angle of view. Note that with respect to the maximum angle of view light beam 3, a principal light ray 4 at the maximum angle of view is indicated by a dashed and dotted line.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, provided in this order from the object side.

Figure 14:
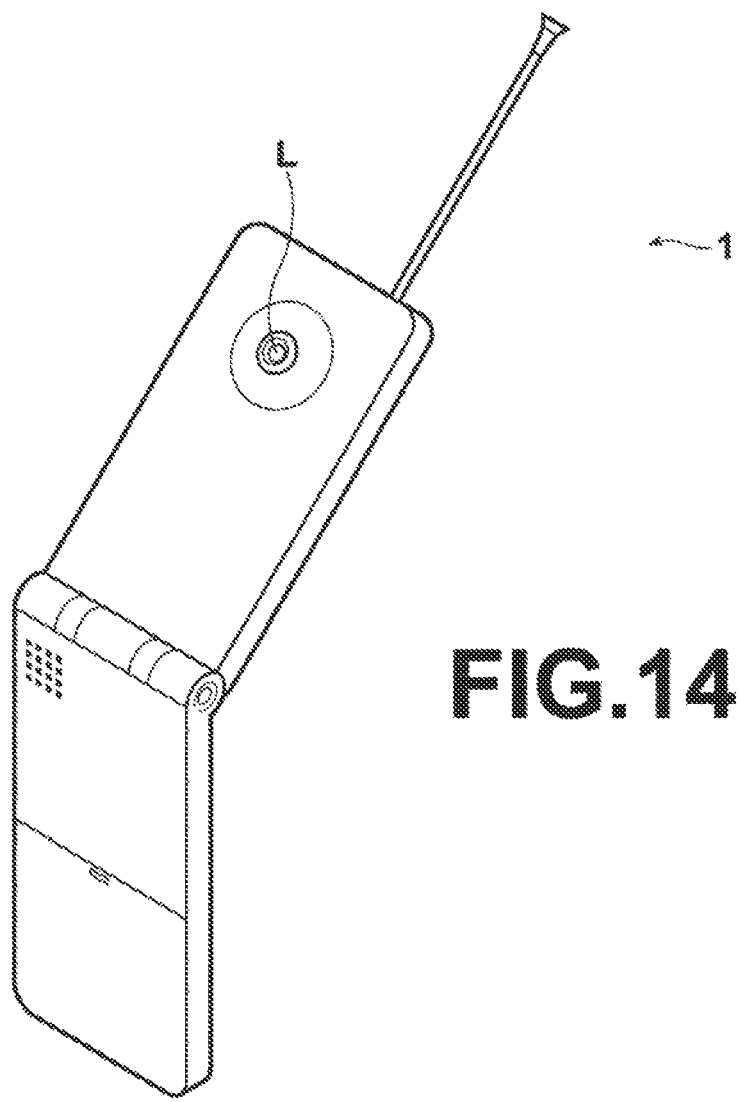
FIG. 14 is a diagram that illustrates a cellular telephone as an imaging apparatus equipped with the imaging lens of the present invention.

FIG. 14 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIGS. 1 through 6) such as a CCD that outputs image signals corresponding to optical images formed by the imaging lens L. The imaging element 100 is provided at an image formation plane of the imaging lens L.

Figure 15:
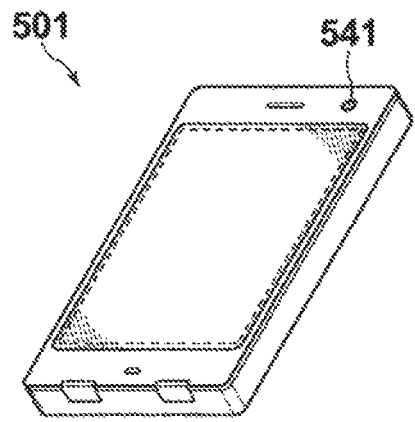
FIG. 15 is a diagram that illustrates a smart phone as an imaging apparatus equipped with the imaging lens of the present invention.

FIG. 15 schematically illustrates a smart phone as an imaging apparatus 501 according to an embodiment of the present invention. The imaging apparatus 501 of the embodiment of the present invention is equipped with a camera section 541 having the imagine, lens L according to the embodiment of the present invention and an imaging element 100 (refer to FIGS. 1 through 6) such as a CCD that outputs image signals corresponding to optical images formed by the imaging lens L. The imaging element 100 is provided at an image formation plane of the imaging lens L.

Various optical members CG may be provided between the fifth lens L5 and the imaging element 100, depending on the configuration of the camera to which the lens is applied. A planar optical member such as a cover glass for protecting an imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the fifth lens L5 to obtain the same effect as that of the optical member CG. In this case, the number of parts can be reduced, and the total length can be shortened.

It is preferable for the imaging lens L to be equipped with an aperture stop St positioned at the object side of the surface of the first lens L1 toward the object side. In the case that the aperture stop St positioned in this manner, increases in the incident angles of light rays that pass through the optical system and enter the image formation plane (imaging element) can be suppressed, particularly at the peripheral portions of an imaging region. Note that the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position.

Further, in the case that the aperture stop St is positioned at the object side of the surface of the first lens L1 toward the object side in the direction of the optical axis, it is preferable for the aperture stop St to be positioned at the image side of the apex of the surface of the first lens L1 toward the object side. In the case that the aperture stop St is positioned at the image side of the apex of the surface of the first lens L1 toward the object side in this manner, the total length of the imaging lens including the aperture stop St can be shortened. Note that in the imaging lenses L of Examples 2 through 6, which are respectively illustrated in FIGS. 2 through 6, the aperture stop St is positioned at the object side of the surface of the first lens L1 toward the object side, and positioned at the image side of the apex of the surface of the first lens L1 toward the object side. Alternatively, the aperture stop St may be positioned at the object side of the apex of the surface of the first lens L1 toward the object side. A case in which the aperture stop St is positioned at the object side of the apex of the surface of the first lens L1 toward the object side is somewhat disadvantageous from the viewpoint of securing peripheral light compared to a case in which the aperture stop St is positioned at the image side of the apex of the surface of the first lens L1 toward the object side. However, increases in the incident angles of light rays at peripheral portions of an imaging region that enter the image formation plane (imaging element) can be more favorably suppressed. Note that the aperture stops St illustrated in FIG. 1 through FIG. 6 do not necessarily represent the sizes or shapes thereof, but indicate the positions thereof on the optical axis Z1.

In the imaging lens L, the first lens L1 has a positive refractive power in the vicinity of the optical axis. Thereby, the configuration of the imaging lens L is advantageous from the viewpoint of shortening the total length of the lens. In addition, the first lens L1 has a convex surface to aid the object side in the vicinity of the optical axis. For this reason, the positive refractive power of the first lens L1, which performs a substantial portion of the image forming function, can be sufficiently increased. Therefore, shortening of the total length of the lens can be more favorably realized. In addition, it is preferable for the first lens L1 to be of a biconvex shape in the vicinity of the optical axis. In this case, positive refractive power can be distributed between the surface of the first lens L1 toward the object side and the surface of the first lens L1 toward the image side. Thereby, spherical aberration which is generated in the first lens L1 can be suppressed.

The second lens L2 has a negative refractive power in the vicinity of the optical axis. In addition, the second lens L2 is of a biconcave shape in the vicinity of the optical axis. In this case, increasing the negative refractive power of the second lens L2 is facilitated, and this configuration is advantageous from the viewpoint of correcting chromatic aberration which is generated by the first lens L1, which has a strong positive refractive power. In addition, negative refractive power can be secured by both the surface of the second lens L2 toward the object side and the surface of the second lens L2 toward the image side, and the generation of aberrations can be favorably suppressed, by the second lens L2 being of a biconcave shape in the vicinity of the optical axis.

The third lens L3 has a positive refractive power in the vicinity of the optical axis. Thereby, a portion of the positive refractive power of the imaging lens L as a whole can be borne by the third lens L3 as appropriate. Therefore, the generation of spherical aberration can be suppressed. In addition, the third lens L3 is of a meniscus shape having a concave surface toward the object side in the vicinity of the optical axis. For this reason, excessive increases in the incident angles (angles formed by a line normal to the surface of the third lens L3 toward the object side and incident light rays) of light rays that pass through the third lens L3 can be suppressed at the surface of the third lens L3 toward the object side. Further, excessive increases in the emergent angles (angles formed by a line normal to the surface of the third lens L3 toward the image side and emergent light rays) of light rays that pass through the third lens L3 can be suppressed at the surface of the third lens L3 toward the image side. Therefore, astigmatism can be favorably corrected.

The fourth lens L4 has a negative refractive power in the vicinity of the optical axis. Thereby, prevention of decreases in the amount of light at the peripheral portions of an imaging region is facilitated, resulting in field curvature and astigmatism being favorably corrected In addition, the fourth lens L4 has a concave surface toward the object side in the vicinity of the optical axis. This configuration is advantageous from the viewpoints of shortening the total length of the lens and correcting spherical aberration. In addition, the fourth lens L4 may be of a biconcave shape in the vicinity of the optical axis. In this case, spherical aberration can be favorably corrected. In addition, if a lens group constituted by the first lens L1 through the third lens L3 is considered to be a first lens group having a positive refractive power, and a lens group formed by the fourth lens L4 and the fifth lens L5 is considered to be a lens group having a negative, refractive power, the imaging lens L is of a telephoto type configuration as a whole. Configuring the fourth lens L4 to have a sufficiently strong negative refractive power is facilitated, by the fourth lens L4 being of a biconcave shape in the vicinity of the optical axis. As a result, the negative refractive power of the second lens group constituted by the fourth lens L4 and the fifth lens L5 becomes sufficiently strong, and the advantageous effect of shortening the total length of the lens by the imaging lens L being of a telephoto type configuration can be favorably obtained. Alternatively, the fourth lens L4 may be of a meniscus shape having a concave surface toward the object side. In this case, astigmatism can be favorably corrected.

The fifth lens L5 has a negative refractive power in the vicinity of the optical axis. Therefore, field curvature can be favorably corrected. In addition, by providing a lens having a negative refractive power most toward the image side in the imaging lens L, a shortening of the total length of the lens can be favorably realized. In addition, the fifth lens L5 is has a concave surface toward the image side in the vicinity of the optical axis. This configuration is more advantageous from the viewpoint of shortening the total length of the lens, and also enables field curvature, spherical aberration, and longitudinal chromatic aberration to be favorably corrected. In addition, it is preferable for the fifth lens L5 to be of a biconcave shape in the vicinity of the optical axis. In this case, configuring the fifth lens L5 which is the lens provided most toward the image side in the imaging tens L, to have a sufficiently strong negative refractive power is facilitated, and insufficient correction of spherical aberration can be prevented.

In addition, it is preferable for the surface of the fifth lens L5 toward the image side to be of an aspherical shape having at least one inflection point within a range from an intersection of a principal light ray at a maximum angle of view with the surface toward the image side inwardly toward the optical axis in the radial direction. In this case, increases in the incident angles of light rays that pass through the optical system and enter the image formation plane (imaging element) can be suppressed, particularly at the peripheral portions of the imaging region. In addition, distortion can be favorably corrected by the surface of the fifth lens L5 toward the image side being of an aspherical shape having at least one inflection point within a range from the intersection of a principal light ray at a maximum angle of view with the surface toward the image side inwardly toward the optical axis in the radial direction. Note that the "inflection point" refers to a point at which the shape of the surface changes from a convex shape to a concave shape tor from a concave shape to a convex shape) with respect to the image side. In addition, in the present specification, the expression "within a range from an intersection of a principal light ray at a maximum angle of view with the surface toward the image side inwardly toward the optical axis in the radial direction" refers to a position at the intersection of the surface toward the image side and the principal light ray at the maximum angle of view and positions along the radial direction toward the optical axis therefrom. The inflection point may be provided on the surface of the fifth lens L5 toward the image side at any arbitrary position from among the position at the intersection of the surface of the fifth lens L5 toward the image side and the principal light ray at the maximum angle of view and positions along the radial direction toward the optical axis therefrom.

According to the imaging lens L described above, the configurations of each of the first lens L1 through the fifth lens L5 are optimized as lens elements in a lens configuration having a total of five lenses. Therefore, a lens system which is compatible with an increased number of pixels, achieves a shortened total length and a wide angle of view, and has high imaging performance from a central angle of view to peripheral angles of view, can be realized.

It is preferable for at least one of the surfaces of each of the first lens L1 through the fifth lens L5 of the imaging L to be an aspherical surface, in order to improve performance.

In addition, it is preferable for each of the first lens L1 through the fifth lens L5 that constitute the imaging lens L to be a single lens, not a cemented lens. If all of the lenses are single lenses, the number of lens surfaces in contact with air will be greater than a case in which some of the lenses are cemented lenses. Therefore, the degree of freedom in the design of each lens will increase. As a result, realization of a shorter total length and a wider angle of view will be facilitated.

Next, the operation and effects of conditional formulae related to the imaging lens L configured as described above will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal length f4 of the fourth lens L4 and the focal length f of the entire system to satisfy Conditional Formula (1) below.

$$-1.2 < f/f4 < -0.2 \quad (1)$$

Conditional Formula (1) defines a preferable range of numerical values for the ratio of the focal length f of the entire system with respect to the focal length f4 of the fourth lens L4. By maintaining the refractive power of the fourth lens L4 such that the value of f/f4 is not less than or equal to the lower limit defined in Conditional Formula (1), the negative refractive power of the fourth lens L4 will not become excessively strong with respect to the refractive power of the entire system.. As a result, spherical aberration becoming excessively corrected can be prevented. By securing the refractive power of the fourth lens L4 such that the value of f/f4 is not greater than or equal to the upper limit defined in Conditional Formula (1), the negative refractive power of the fourth lens L4 will not become excessively weak with respect to the refractive power of the entire system. As a result, lateral chromatic aberration and spherical aberration can be favorably corrected, in addition, this configuration is also advantageous from realizing a shortening of the total length. It is preferable for Conditional Formula (1-1) to be satisfied, and more preferable for Conditional Formula. (1-2) to be satisfied, in order to cause these advantageous effects to become more prominent.

$$-1 < f/f4 < -0.25 \quad (1\text{-}1)$$

$$-0.85 < f/f4 < -0.3 \quad (1\text{-}2)$$

In addition, it is preferable for the focal length f5 of the fifth lens L5 and the focal length f of the entire system to satisfy Conditional Formula (2) below.

$$-1.18 < f/f5 < -0.35 \quad (2)$$

Conditional Formula (2) defines a preferable range of numerical values for the ratio of the focal length f of the entire system with respect to the focal length f5 of the fifth lens L5. By suppressing the refractive power of the fifth lens L5 such that the value of f/f5 is not less than or equal to the lower limit defined in Conditional Formula (2), the negative refractive power of the fifth lens L5 will not become excessively strong with respect to the refractive power of the entire system. As a result, increases in the incident angles of light rays that pass through the imaging lens L and enter the image formation plane (imaging element) at the peripheral portions of the imaging region can be favorably suppressed. In addition, by suppressing the refractive power of the filth lens L5 such that the value of f/f5 is not less than or equal to the lower limit defined in Conditional Formula (2), the generation of distortion and astigmatism can be suppressed. By securing the refractive power of the fifth lens L5 such that the value of f/f5 is not greater than or equal to the upper limit defined in Conditional Formula (2), the negative refractive power of the fifth lens L5 will not become excessively weak with respect to the refractive power of the entire system. As a result, a shortening of the total length of the lens can be realized. There is a tendency for back focus to become short accompanying shortening of the total lengths of lenses. However, by satisfying the upper limit of Conditional Formula (2), back focus can be appropriately maintained, and field curvature can be favorably corrected. It is preferable for Conditional Formula (2-1) to be satisfied, and more preferable for Conditional Formula (2-2) to be satisfied, in order to cause these advantageous effects to become more prominent.

$$-1.17 < f/f5 < -0.44 \quad (2\text{-}1)$$

$$1.1 < f/f5 < -0.7 \quad (2\text{-}2)$$

In addition, it is preferable for the focal length f of the entire system and the refractive power P34 of an air lens formed between the surface of the third lens L3 toward the image side and the surface of the fourth lens L4 toward the object side to satisfy Conditional Formula (3) below.

$$1.5 < f \cdot P34 < 5 \quad (3)$$

Here, P34 is obtained by Formula (P1) below:

$$P34 = \frac{1 - Nd3}{L3r} + \frac{Nd4 - 1}{L4f} - \frac{(1 - Nd3) \times (Nd4 - 1) \times D7}{L3r \times L4f} \quad (P1)$$

wherein Nd3 is the refractive index of the third lens with respect to the d line. Nd4 is the refractive index of the fourth lens with respect to the d line. L3r is the paraxial radius of curvature of the surface of the third lens toward the image side. L4f is the paraxial radius of curvature of the surface of the fourth lens toward the object side, and D7 is an air space distance between the third lens and the fourth lens along the optical axis.

Refractive power is an inverse of focal length. Therefore, if the focal length of the air lens formed between the surface of the third lens L3 toward the image side and the surface of the fourth lens L4 toward the object side is designated as f34a.

Conditional Formula (3) defines a preferable range of numerical values for the ratio of the focal length f of the entire system with respect to the focal length f34a. By configuring the imaging lens such that the value of f·P34 is not less than or equal to the lower limit defined in Conditional Formula (3), the positive refractive power of the air lens formed between the surface of the third lens L3 toward the image side and the surface of the fourth lens L4 toward the object side will not be excessively weak. As a result, increases in the incident angles of light rays that pass through the optical system and enter the image formation plane (imaging element) can be suppressed, particularly from intermediate angles of view to peripheral angles of view. By configuring the imaging lens such that the value of f·P34 is not greater than or equal to the upper limit defined in Conditional Formula (3), the refractive power of the air lens formed between the surface of the third lens L3 toward the image side and the surface of the fourth lens L4 toward the object side will not be excessively strong. As a result, the generation of spherical aberration can be suppressed. It is more preferable for Conditional Formula (3-1) to be satisfied, and even more preferable for Conditional Formula (3-2) to be satisfied, in order to cause these advantageous effects to become more prominent.

$$1.6 < f \cdot P34 < 4 \tag{3-1}$$

$$2.4 < f \cdot P34 < 3 \tag{3-2}$$

In addition, it is preferable for the focal length f of the entire system and the refractive power P45 of an air lens formed between the surface of the fourth lens L4 toward the image side and the surface of the fifth lens L5 toward the object side to satisfy Conditional Formula (4) below.

$$-2 < f \cdot P45 < 1.1 \tag{4}$$

Here, P45 is obtained by Formula (P2) below:

$$P45 = \frac{1 - Nd4}{L4r} + \frac{Nd5 - 1}{L5f} - \frac{(1 - Nd4) \times (Nd5 - 1) \times D9}{L4r \times L5f} \tag{P2}$$

wherein Nd4 is the refractive index of the fourth lens with respect to the d Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

Refractive power is an inverse of focal length. Therefore, if the focal length of the air lens formed between the surface of the fourth lens L4 toward the image side and the surface of the fifth lens L5 toward the object side is designated as f45a, Conditional Formula (4) defines a preferable range of numerical values for the ratio of the focal length f of the entire system with respect, to the focal length f45a. By configuring the imaging lens such that the value of f·P45 is not less than or equal to the lower limit defined in Conditional Formula (4), the negative refractive power of the air lens formed between the surface of the fourth lens L4 toward the image side and the surface of the fifth lens L5 toward the object, side will not be excessively strong. As a result, excessive correction of field curvature can be prevented. Configuring the imaging lens such that the value of f·P45 is not greater than or equal to the upper limit defined in Conditional Formula (4) is advantageous from the viewpoint of suppressing the generation of spherical aberration. By configuring the imaging lens such that the value of f·P45 is not greater than or equal to the upper limit defined in Conditional Formula (4), the negative refractive power of the, air lens formed between the surface of the fourth lens L4 toward the image side and the surface of the fifth lens L5 toward the object side can be secured. As a result, the generation of spherical aberration can be suppressed. It is more preferable for Conditional Formula (4-1) to be satisfied, and even more preferable for Conditional Formula (4-2) to be satisfied, in order to cause these advantageous effects to become more prominent.

$$-1.5 < f \cdot P45 < 0 \tag{4-1}$$

$$-1.2 < f \cdot P45 < -0.5 \tag{4-2}$$

In addition, it is preferable for the paraxial radius of curvature L2f of the surface of the second lens L2 toward the object side and the paraxial radius of curvature L2r of the surface of the second lens L2 toward the image side to satisfy Conditional Formula (5) below, $$0.08 < (L2r + L2f)/(L2r - L2f) < 1 \tag{5}$$

Conditional Formula (5) defines preferred ranges of numerical values for the paraxial radius of curvature L2f of the surface of the second lens L2 toward the object side and the paraxial radius of curvature L2r of the surface of the second lens L2 toward the image side. The negative power of the surface of the second lens L2 toward the object side can be made stronger than the negative power of the surface of the second lens L2 toward the image side by configuring the imaging lens such that the value of (L2r+L2f)/(L2r−L2f) is not less than or equal to the lower limit defined in Conditional Formula (5). As a result, increases in the incident angles of light rays that pass through the optical system and enter the image formation plane (imaging element) can be suppressed from intermediate angles of view to peripheral angles of view In addition, the generation of positive distortion and astigmatism can be suppressed, by configuring the imaging lens such that the value of (L2r+L2f)/(L2r−L2f) is not less than or equal to the lower limit defined in Conditional Formula (5). The negative power of the surface of the second lens L2 toward the image side can be secured by configuring the imaging lens such that the value of (L2r+L2f)/(L2r−L2f) is not greater than or equal to the upper limit defined in Conditional Formula (5). As a result, a widening of the angle of view can be favorably realized. In addition, this configuration is advantageous from the viewpoint of shortening the total length of the lens with respect to image sizes. It is more preferable for Conditional Formula (5-1) below to be satisfied, and even more preferable for Conditional Formula (5-2) to be satisfied, in order to cause these advantageous effects to become more prominent.

$$0.09 < (L2r + L2f)/(L2r - L2f) < 0.99 \tag{5-1}$$

$$0.1 < (L2r + L2f)/(L2r - L2f) < 0.985 \tag{5-2}$$

In addition, it is preferable for the focal length f of the entire system, the half value (a of the maximum tingle of view in it state focused on an object at infinity, and the paraxial radius of curvature L5r of the surface of the fifth lens L5 toward the image side to satisfy Conditional Formula (6) below.

$$0 < f \cdot \tan\omega / L5r < 0.7 \tag{6}$$

Conditional Formula (6) defines a preferable range of numerical values for the ratio of the paraxial image height (f·tanω) with respect to the paraxial radius of curvature L5r of the surface of the fifth lens L5 toward the image side. By setting the paraxial image height (f·tanω) with respect to the paraxial radius of curvature L5r of the surface of the fifth lens L5 toward the image side such that the value of f·tanω/L5r is not less than or equal to the lower limit defined in Conditional Formula (5), the absolute value of the paraxial radius of curvature L5r of the surface of the fifth lens L5 toward the image side, which is the surface most toward the image side in the imaging lens, will not become excessively great. As a result, a shortening of the total length of the lens can be realized, while field curvature, spherical aberration, and longitudinal chromatic aberration can be sufficiently corrected. Note that if the fifth lens L5 has a concave surface toward the image side and is of an aspherical shape having at least one inflection point as shown in the imaging lenses L of each of the Examples and the lower limit of Conditional Formula (6) is satisfied, field curvature can be favorably corrected from a central angle of view to peripheral angles of view. This configuration is favorable from the viewpoint of realizing a wider angle of view. By setting the paraxial image height (f·tanω) with respect to the paraxial radius of curvature L5r of the surface of the fifth lens L5 toward the image side such that the value of f·tanω/L5r is not greater than or equal to the upper limit defined in Conditional Formula (6), the absolute value of the paraxial radius of curvature L5r of the surface of the fifth lens L5 toward the image side, which is the surface most toward the image side in the imaging lens, will not become excessively small. This will result in increases in the incident angles of light rays that pass through the optical system and enter the image formation plane (imaging element) being suppressed, particularly at intermediate angles of view. In addition, excessive correction of field curvature can be prevented.

It is preferable for the focal length f1 of the first lens L1 and the focal length f of the entire system to satisfy Conditional Formula (7) below, $$1 < f/f1 < 3 \quad (7)$$

Conditional Formula (7) defines a preferable range of numerical values for the ratio of the focal length f of the entire system with respect, to the focal length f1 of the first lens L1. By securing the refractive power of the first lens L1 such that the value of f/f1 is not less than or equal to the lower limit defined in Conditional Formula (7), the positive refractive power of the first lens L1, which mainly bears a light collecting function, will not become excessively weak with respect to the refractive power of the entire system. As a result, a shortening of the total length of the lens can be favorably realized. By suppressing the refractive power of the first lens L1 such that the value of f/f1 is not greater than or equal to the upper limit defined in Conditional Formula (7), the positive refractive power of the first lens L1 will not become excessively strong with respect to the refractive power of the entire system. As a result, the generation of spherical aberration and astigmatism can be suppressed. It is preferable for Conditional Formula (7-1) to be satisfied, and more preferable for Conditional Formula (7-2) to be satisfied, in order to cause these advantageous effects to become more prominent.

$$1.5 < f/f1 < 2 \quad (7-1)$$

$$1.6 < f/f1 < 1.75 \quad (7-2)$$

Further improved imaging performance can be realized in the imaging lenses according to the embodiments of the present invention by satisfying the above preferred conditions appropriately. In addition, the imaging apparatuses according to the embodiments of the present invention output image signals corresponding to optical images formed by the high performance imaging lenses according to the embodiments of the present invention. Therefore, images having high resolution can be obtained, while achieving a shortening of the apparatus size.

In addition, in the case that the lens configurations of each of the first lens L1 through the fifth lens L5 are set such that the maximum angle of view in a state focused on an object at infinity is 75 degrees or greater as in the imaging lenses of the first through sixth embodiments, realizing a shortening of the total length of the lens with respect to image sizes can be facilitated. As a result, the imaging lens L may be favorably applied for use with imaging elements that satisfy demand regarding increased resolution, such as those in cellular telephones.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with surface of optical element most toward the object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect. to the d line are shown in the column vdj.

Table 1 also shows the aperture stop St and the optical member CG. In Table 1, a surface number and the text "(St)" are shown in the row of the surface number that corresponds to the aperture stop St, and a surface number and the text "(IMG)" are shown in the surface number corresponding to the imaging surface. The signs of the radii of curvature are positive for surface shapes having convex surfaces toward the object side, and negative for surface shapes having convex surfaces toward the image side. In addition, the values of the focal length f (mm) of the entire system, the back focus Bf (mm), the F number Fno., and the maximum angle of view 2 ω (°) are shown as data above the lens data. Note that the back focus Bf is represented as an air converted value.

A "*" mark is appended to the surface numbers of aspherical surfaces in the basic lens data of Table 1. In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface $$Z = \frac{C \times h^2}{1 + \sqrt{1 - KA \times C^2 \times h^2}} + \sum_n An \times h^n \quad (A)$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 6 are shown in Table 3 through Table 12 as Example 2 through Example 6. In the imaging lenses of Examples 1 through 6, both of the surfaces of the first lens L1 through the fifth lens L5 are all aspherical surfaces.

Figure 8:
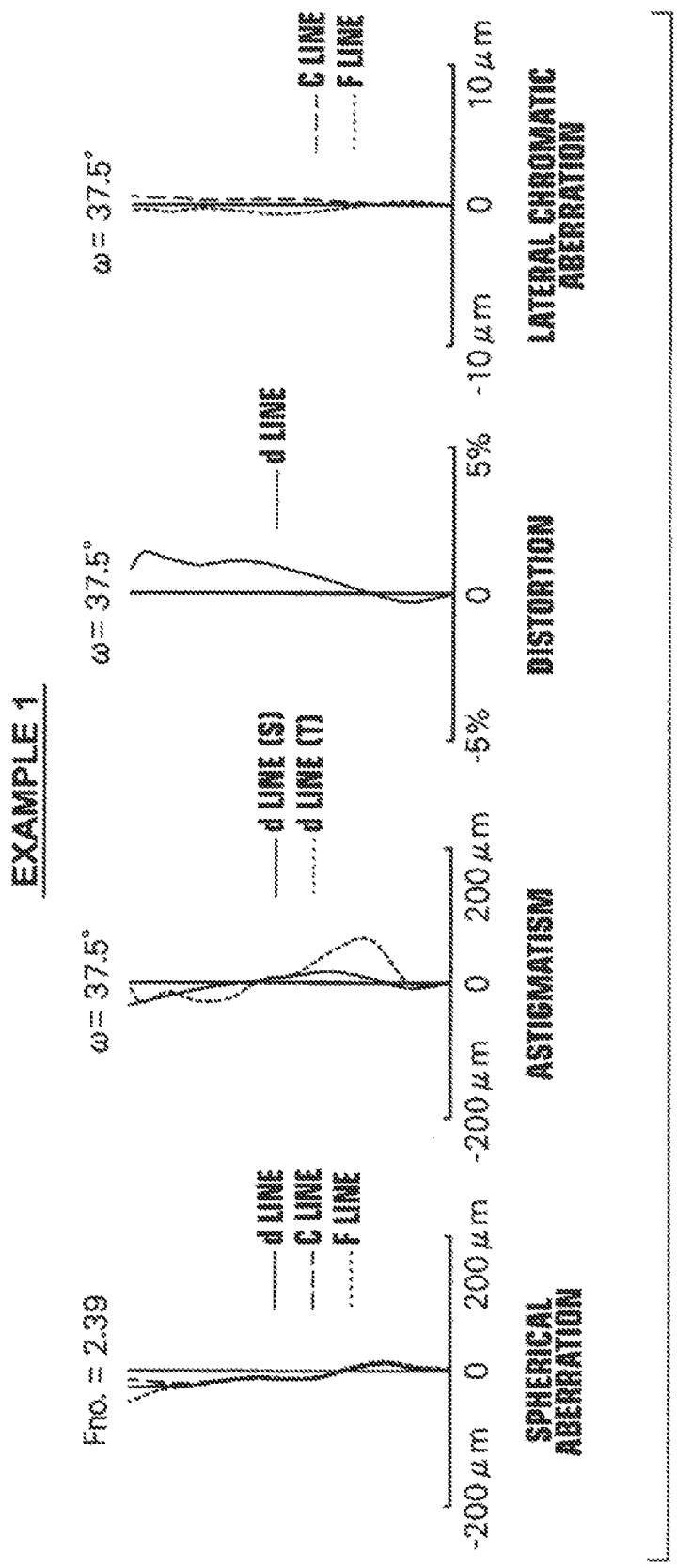
FIG. 8 is a collection of diagrams that illustrate aberrations of the imaging lens of Example 1, wherein the diagrams illustrate spherical aberration, astigmatism, distortion, and lateral chromatic aberration, in this order from the left side of the thawing sheet.

FIG. 8 is a collection of diagrams that illustrate aberrations of the imaging lens of Example 1, wherein the diagrams illustrate the spherical aberration, the astigmatism (field curvature), the distortion and the lateral chromatic aberration (chromatic aberration of magnification) of the imaging lens of Example 1, respectively, in this order from the left side of the drawing sheet. Each of the diagrams that illustrate the spherical aberration, the astigmatism (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm) and the g line (wavelength: 435.8 nm). The diagram that illustrates lateral chromatic aberration shows aberrations related to the F line, the C line, and the g line. In the diagram that illustrates astigmatism, aberration in the sagittal direction (S) is indicated by a solid line, while aberration in the tangential direction (T) is indicated b a broken line. In addition, "Fno." denotes F numbers, and "ω" denotes a half value of the maximum angle of view m a state focused on an object at infinity.

Figure 3:
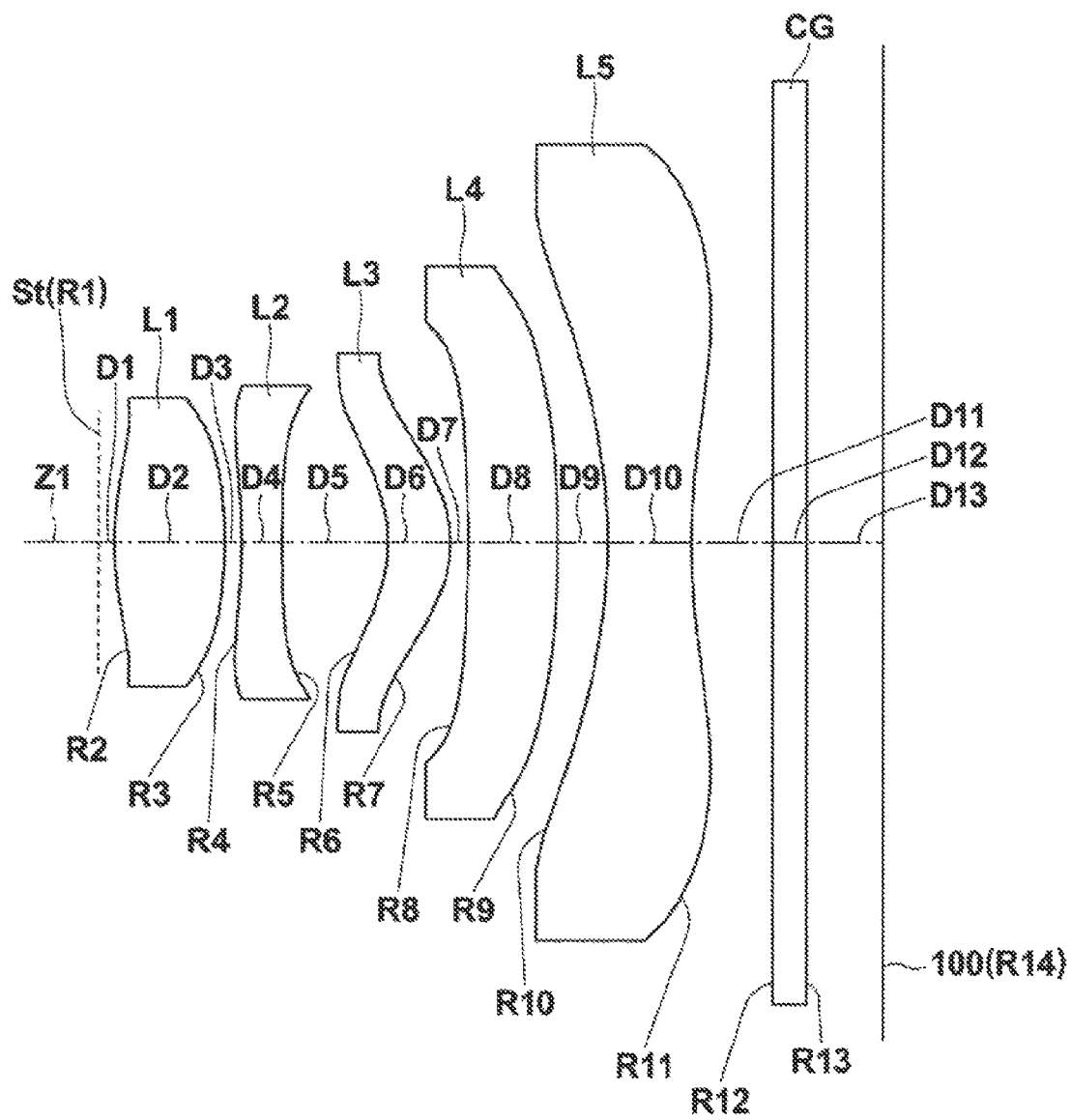
FIG. 3 is a sectional diagram that illustrates a third example of the configuration of an imaging lens according to an embodiment of the present invention, and corresponds to a lens of Example 3.
Figure 4:
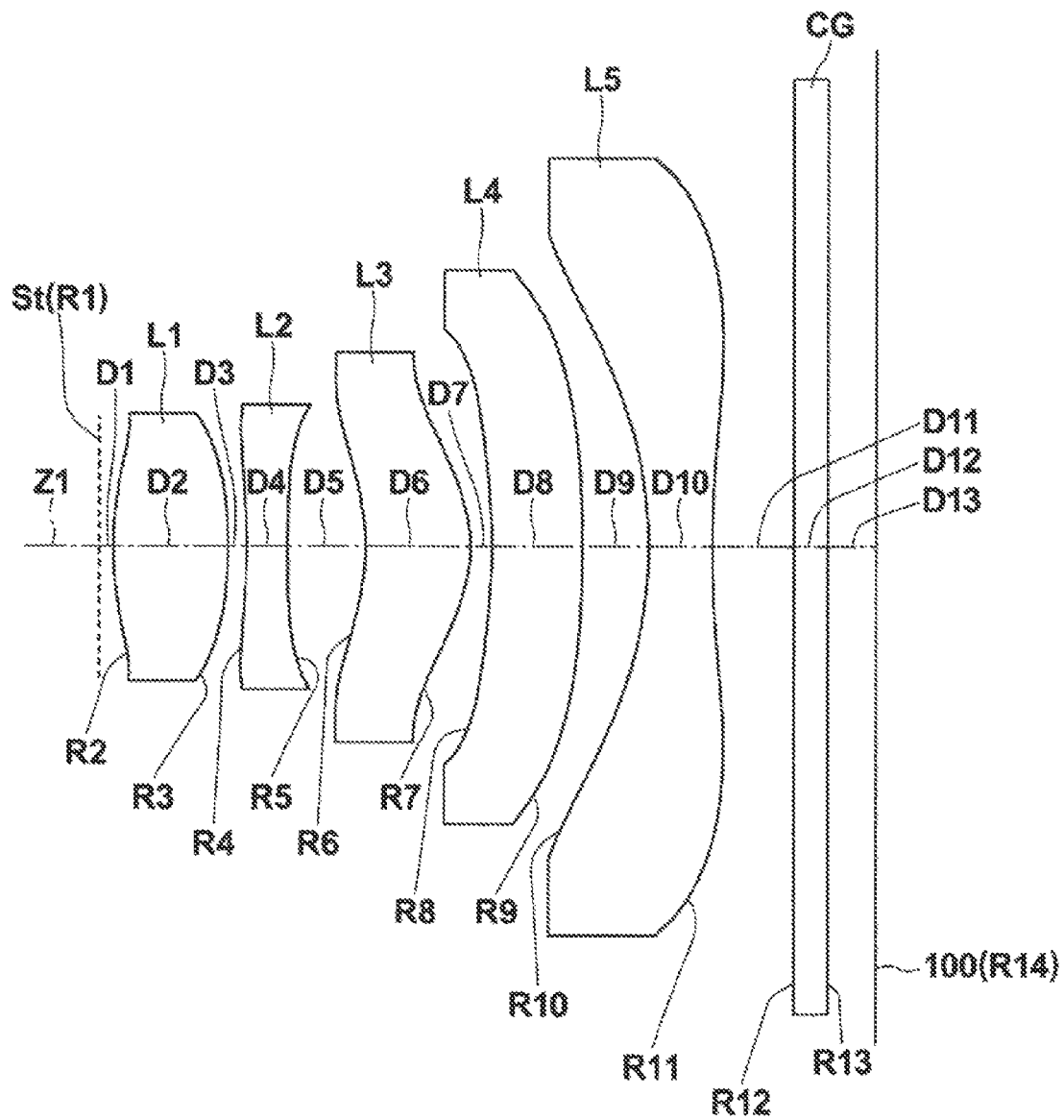
FIG. 4 is a sectional diagram that illustrates a fourth example of the configuration of an imaging lens according to an embodiment of the present invention, and corresponds to a lens of Example 4.
Figure 5:
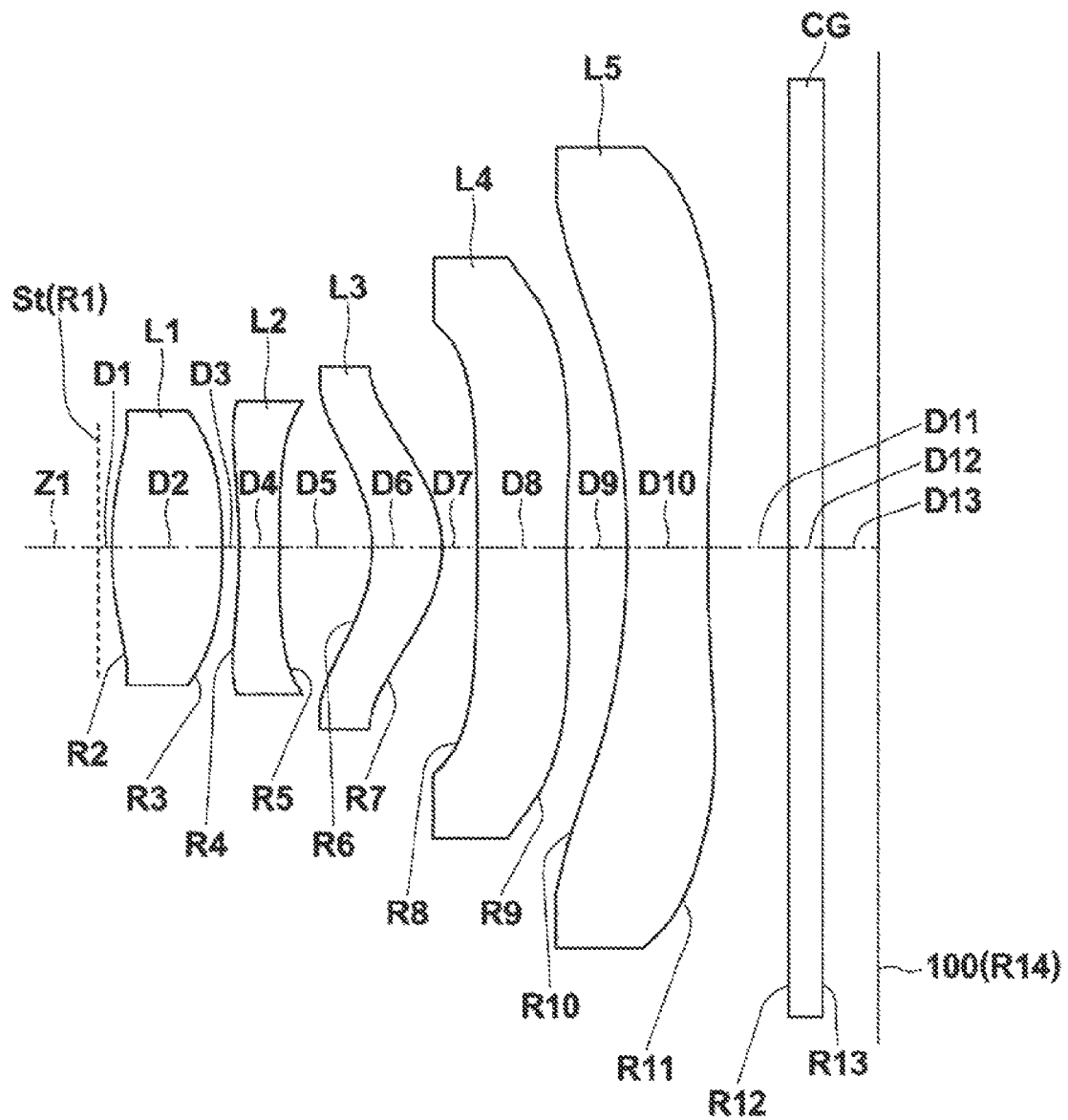
FIG. 5 is a sectional diagram that illustrates a fifth example of the configuration of an imaging lens according to an embodiment of the present invention, and corresponds to a lens of Example 5.
Figure 9:
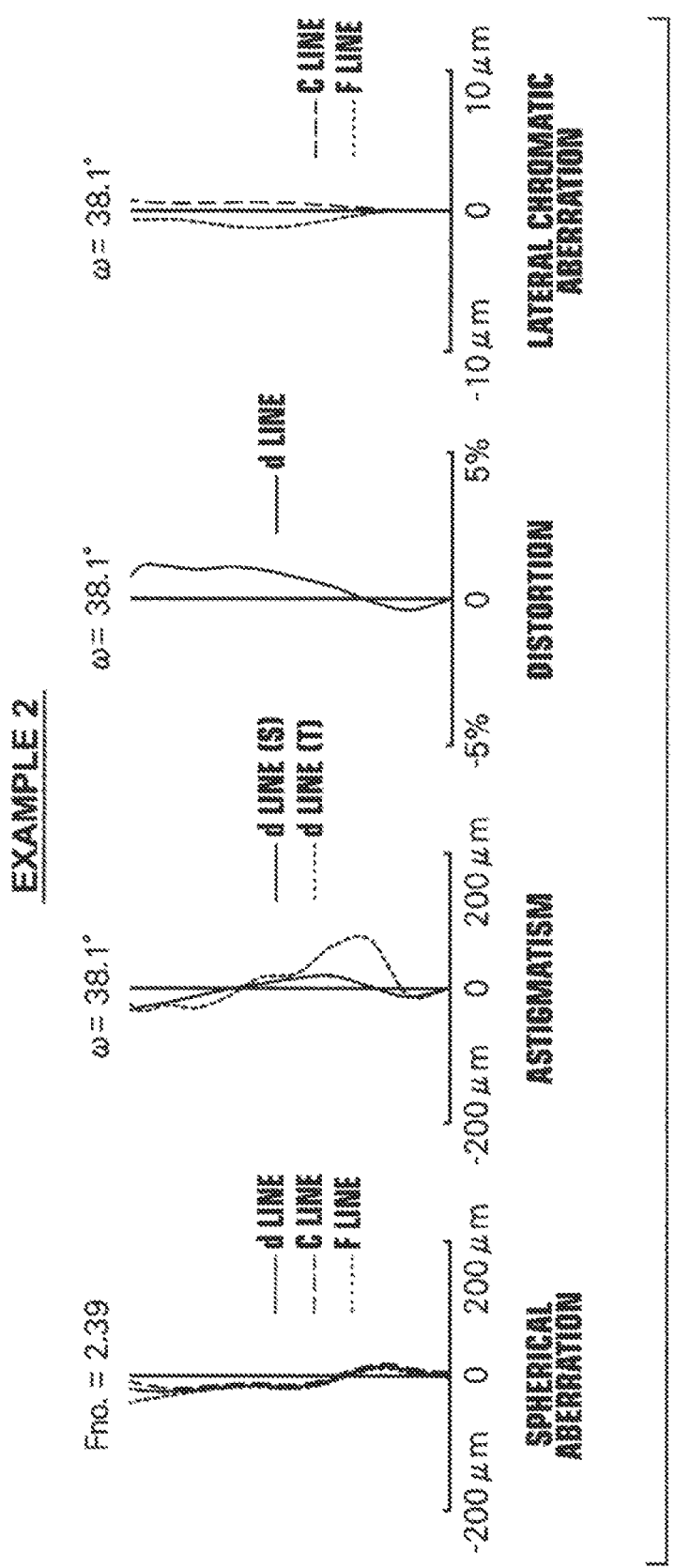
FIG. 9 is a collection of diagrams that illustrate aberrations of the imaging lens of Example 2, wherein the diagrams illustrate spherical aberration, astigmatism, distortion, and lateral chromatic aberration, in this order from the left side of the drawing sheet.
Figure 10:
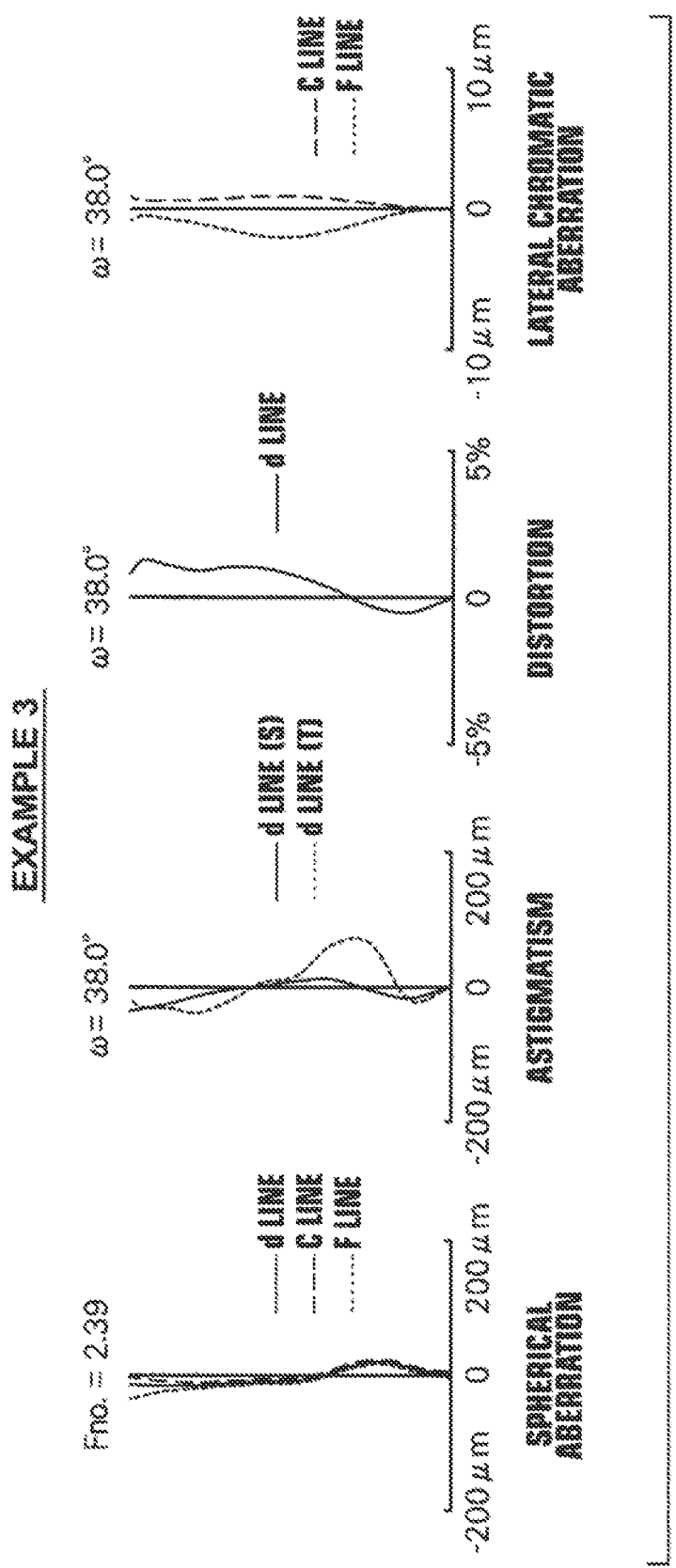
FIG. 10 is a collection of diagrams that illustrate aberrations of the imaging lens of Example 3, wherein the diagrams illustrate spherical aberration, astigmatism, distortion, and lateral chromatic aberration, in this order from the left side of the drawing sheet.
Figure 11:
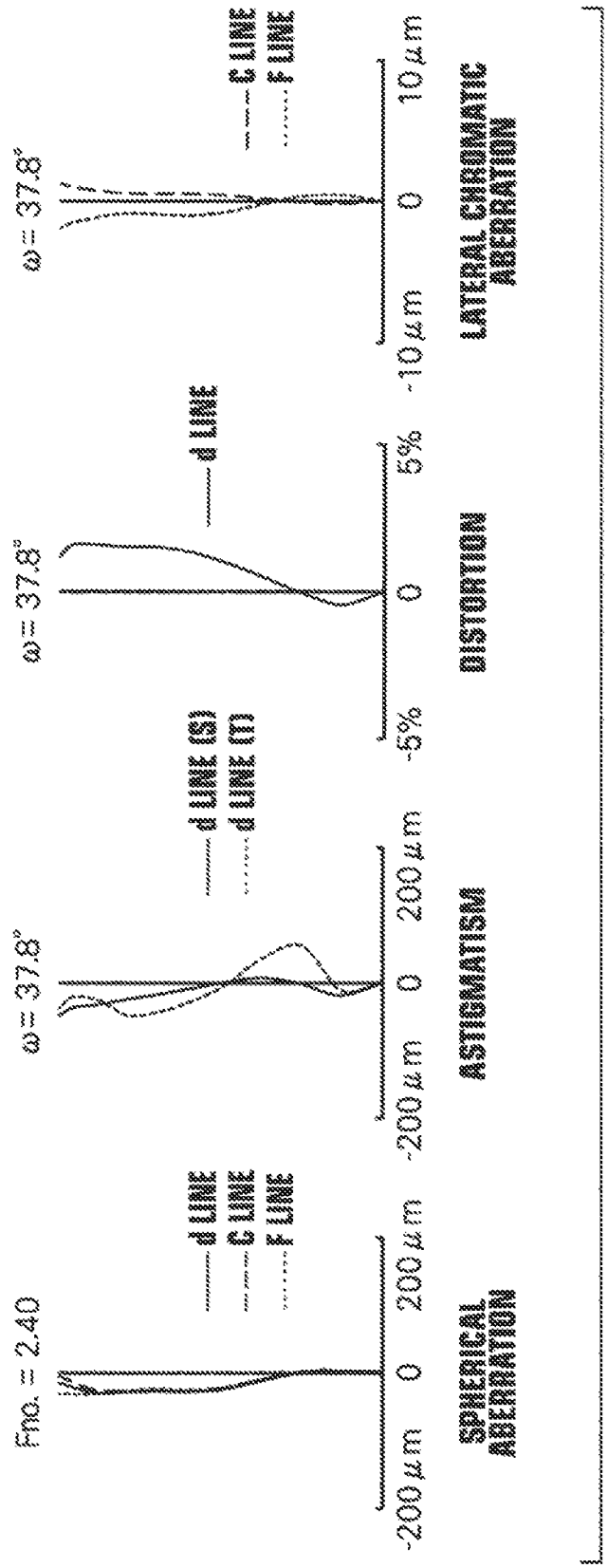
FIG. 11 is a collection of diagrams that illustrate aberrations of the imaging lens of Example 4, wherein the diagrams illustrate spherical aberration, astigmatism, distortion, and lateral chromatic aberration, in this order from the left side of the drawing sheet.
Figure 12:
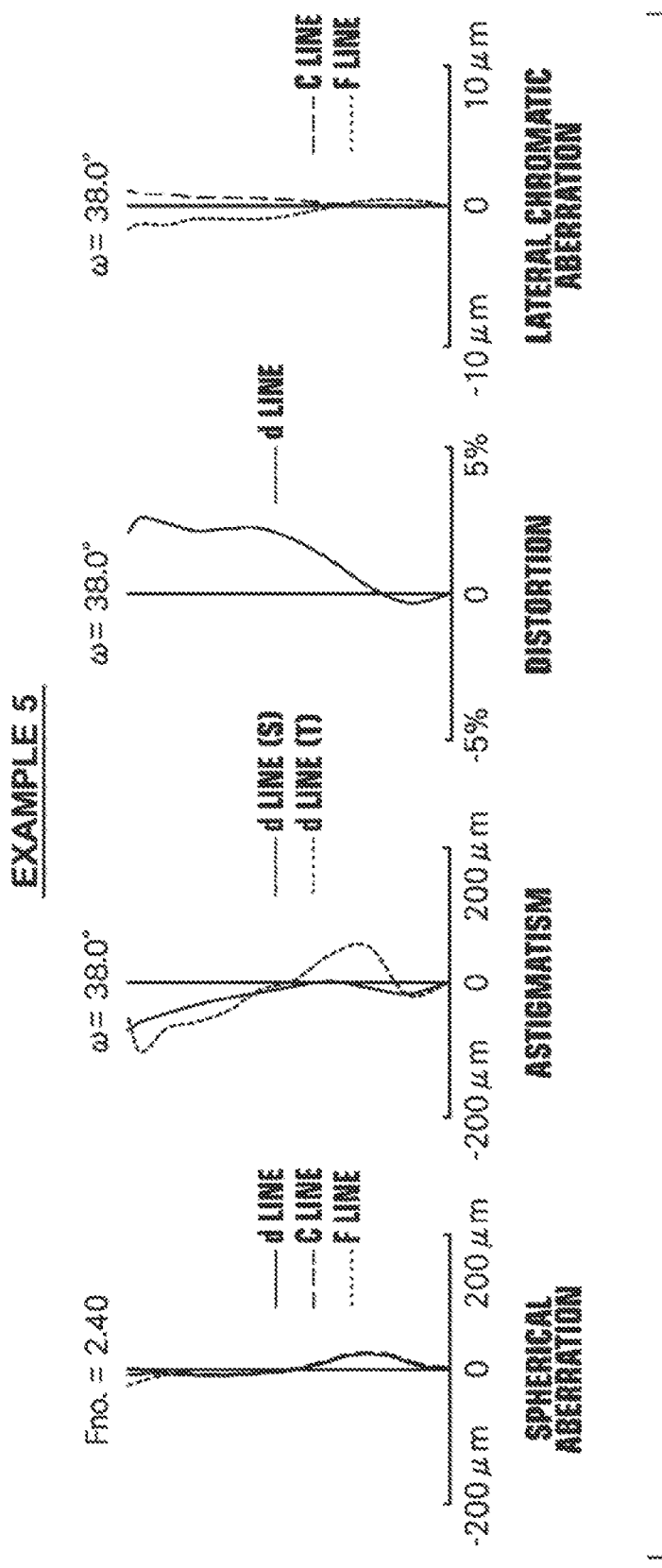
FIG. 12 is a collection of diagrams that illustrate aberrations of the imaging lens of Example 5, wherein the diagrams illustrate spherical aberration, astigmatism, distortion, and lateral chromatic aberration, in this order from the left side of the drawing sheet.
Figure 13:
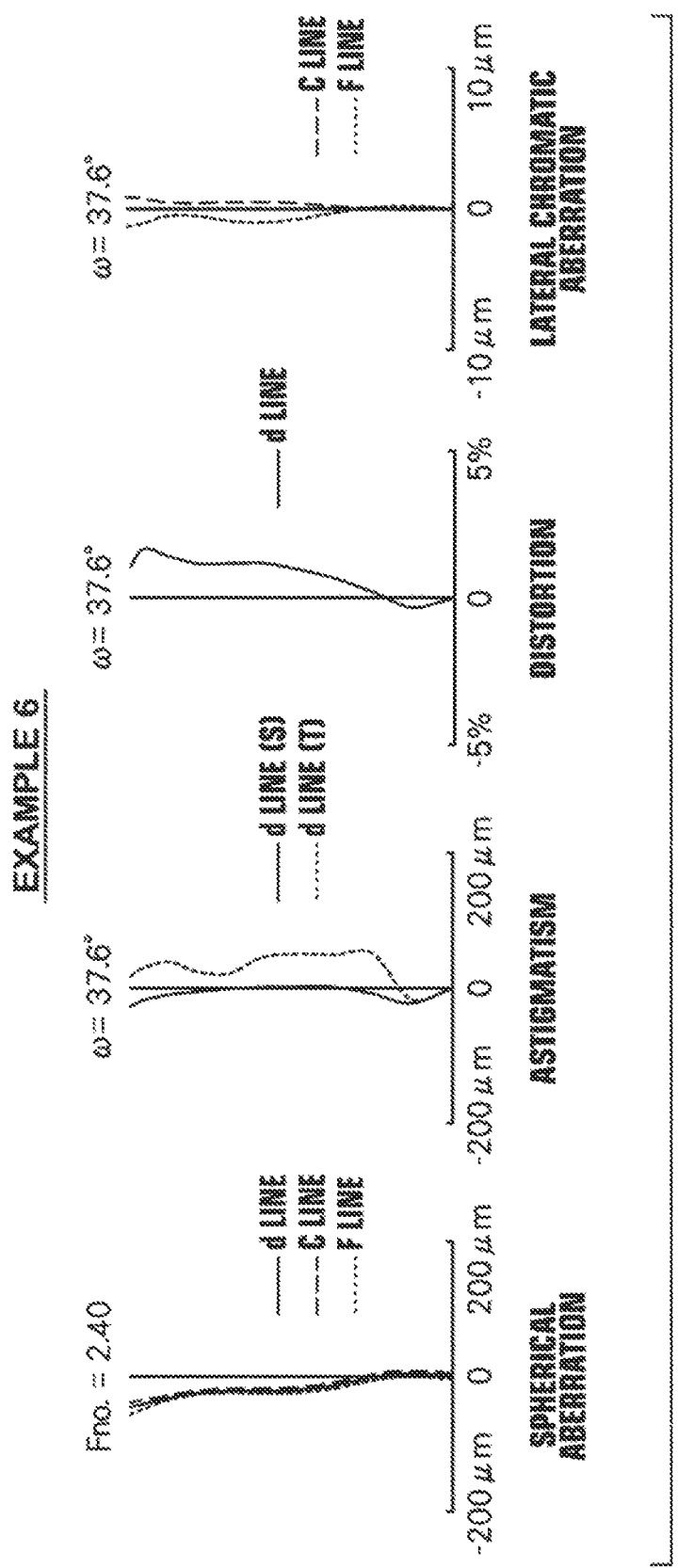
FIG. 13 is a collection of diagrams that illustrate aberrations of the imaging lens of Example 6, wherein the diagrams illustrate spherical aberration, astigmatism, distortion, and lateral chromatic aberration, in this order from the left side of the drawing sheet.

Similarly, the aberrations of the imaging lens of Example 2 through Example 6 are illustrated in FIG. 9 through FIG. 3. The diagrams that illustrate aberrations in FIG. 9 through FIG. 13 are for those in which the object distance is infinity.

Table 13 shows values corresponding to Conditional Formulae (1) through (7), respectively summarized for each of Examples 1 through 6.

Note that each of the tables show numerical values which are rounded off at a predetermined number of digits. "°" are employed as units for the numerical values indicating angles and "mm" are employed as units for the numerical values indicating lengths. However, these units are merely examples. Other appropriate units may be employed, because it is possible to utilize optical systems which are proportionately enlarged or proportionately reduced in size.

As can be understood from each set of numerical value data and from the diagrams that illustrate aberrations, the imaging lenses of Examples 1 through 6 have widened maximum angles of view of 75° or greater in is state focused on an object at infinity, shortened total lengths, favorably correct various aberrations, and realize high imaging performance from a central angle of view to peripheral angles of view.

The present invention has been described using the embodiments and the Examples. However, the imaging lens of the present invention is not limited, to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to h utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 3.98, Bf = 1.10, Fno. = 2.39, 2ω = 75.0

| Si | Ri | Di | Ndj | νdj |
|---|---|---|---|---|
| 1(St) | ∞ | 0.0803 | | |
| *2 | 2.0328 | 0.6818 | 1.54488 | 54.87 |
| *3 | −2.8652 | 0.1000 | | |
| *4 | −5.2661 | 0.2500 | 1.63351 | 23.63 |
| *5 | 6.4100 | 0.6756 | | |
| *6 | −0.9842 | 0.3638 | 1.54488 | 54.87 |
| *7 | −0.7266 | 0.1006 | | |
| *8 | −11.5366 | 0.5048 | 1.63351 | 23.63 |
| *9 | 11.2855 | 0.3260 | | |
| *10 | −3.7727 | 0.5442 | 1.54488 | 54.87 |
| *11 | 5.5198 | 0.5000 | | |
| 12 | ∞ | 0.2100 | 1.51680 | 64.20 |
| 13 | ∞ | 0.4586 | | |
| 14(IMG) | ∞ | | | |

*aspherical surface

TABLE 2

Example 1: Aspherical Surface Data

| Surface Number | KA | A3 | A4 | A5 | A6 |
|---|---|---|---|---|---|
| 2 | 1.4062608E+00 | 0.0000000E+00 | 6.6845892E−02 | −1.1672219E+00 | 3.2751738E+00 |
| 3 | −1.2264623E+01 | 0.0000000E+00 | −1.1906717E−01 | 2.0102330E−01 | −2.7279787E+00 |
| 4 | 1.6018909E+01 | 0.0000000E+00 | −2.8548716E−02 | 1.3837409E+00 | −2.6665883E+00 |
| 5 | −1.0000009E+01 | 0.0000000E+00 | 1.7362114E−01 | 4.6656269E−01 | −2.0818076E+00 |
| 6 | −5.9147306E−01 | 0.0000000E+00 | −2.5895925E−01 | 1.9822934E+00 | −8.1603559E+00 |
| 7 | −3.6826522E+00 | 0.0000000E+00 | −1.1445841E+00 | 2.3372792E+00 | −2.0740479E+00 |
| 8 | 9.1948068E+00 | 0.0000000E+00 | −1.0019513E−01 | 2.3105361E+00 | −1.0979934E+01 |
| 9 | −9.9999907E+00 | 0.0000000E+00 | −3.3245143E−01 | 3.3921098E+00 | −2.0186301E−01 |
| 10 | −8.7054885E−01 | 0.0000000E+00 | 9.5601932E−02 | −2.3972682E−01 | 6.6282982E−01 |

TABLE 2-continued

Example 1: Aspherical Surface Data

| | | | | | |
|---|---|---|---|---|---|
| 11 | −9.9999973E+00 | 0.0000000E+00 | 1.2495906E−02 | −3.5943822E−03 | 3.8650941E−02 |

| | A7 | A8 | A9 | A10 | A11 |
|---|---|---|---|---|---|
| 2 | 3.0280456E+00 | −4.2748299E+01 | 1.1408478E+02 | −1.4876682E+02 | 9.8427775E+01 |
| 3 | 1.2856991E+01 | −3.4076281E+01 | 5.3351305E+01 | −4.9061931E+01 | 2.4677476E+01 |
| 4 | −5.0900304E+00 | 3.0494654E+01 | −5.9566862E+01 | 6.1899306E+01 | −3.3974146E+01 |
| 5 | 5.7429621E+00 | −1.3287926E+01 | 2.2382896E+01 | −2.3846225E+01 | 1.4396576E+01 |
| 6 | 2.4762588E+01 | −5.1329627E+01 | 7.0416760E+01 | −6.0036367E+01 | 2.8495263E+01 |
| 7 | 1.6089639E+00 | −4.6078220E+00 | 1.1004109E+01 | −1.2521550E+01 | 6.7714644E+00 |
| 8 | 2.5500741E+01 | −3.5106918E+01 | 3.0118200E+01 | −1.5798327E+01 | 4.6108156E+00 |
| 9 | 2.9119495E−01 | −3.9318287E−01 | 2.7695668E−01 | −9.2038045E−02 | 3.7785835E−03 |
| 10 | −1.2979349E+00 | 1.5240432E+00 | −1.0934613E+00 | 4.7449320E−01 | −1.1425897E−01 |
| 11 | −2.0292572E−01 | 2.8972915E−01 | −2.0471669E−01 | 7.9861661E−02 | −1.6443269E−02 |

| | A12 |
|---|---|
| 2 | −2.6523462E+01 |
| 3 | −5.3082036E+00 |
| 4 | 7.7115783E+00 |
| 5 | −3.7465075E+00 |
| 6 | −5.7318709E+00 |
| 7 | −1.4304676E+00 |
| 8 | −5.6948488E−01 |
| 9 | 3.7313039E−03 |
| 10 | 1.1674273E−02 |
| 11 | 1.3904129E−03 |

TABLE 3

Example 2
$f = 3.89$, $Bf = 1.06$, $Fno. = 2.39$, $2\omega = 76.2$

| Si | Ri | Di | Ndj | vdj |
|---|---|---|---|---|
| 1(St) | ∞ | 0.1000 | | |
| *2 | 2.2066 | 0.6481 | 1.54488 | 54.87 |
| *3 | −2.9267 | 0.0996 | | |
| *4 | −3.9204 | 0.2580 | 1.63351 | 23.63 |
| *5 | 400.3962 | 0.6326 | | |
| *6 | −0.9879 | 0.4158 | 1.54488 | 54.87 |
| *7 | −0.7465 | 0.1145 | | |
| *8 | −400.3603 | 0.5227 | 1.63351 | 23.63 |
| *9 | 4.3891 | 0.3398 | | |
| *10 | −3.6264 | 0.5500 | 1.54488 | 54.87 |
| *11 | 7.4036 | 0.5000 | | |
| 12 | ∞ | 0.2100 | 1.51680 | 64.20 |
| 13 | ∞ | 0.4227 | | |
| 14(IMG) | ∞ | | | |

*aspherical surface

TABLE 4

Example 2: Aspherical Surface Data

| Surface Number | KA | A3 | A4 | A5 | A6 |
|---|---|---|---|---|---|
| 2 | 9.4166298E−01 | 0.0000000E+00 | 6.7728011E−02 | −1.1924064E+00 | 3.3538051E+00 |
| 3 | −8.9683351E+00 | 0.0000000E+00 | −1.4262294E−01 | 1.5859261E−01 | −2.6486639E+00 |
| 4 | 1.2491128E+01 | 0.0000000E+00 | −7.3353333E−02 | 1.5273929E+00 | −2.6829713E+00 |
| 5 | −1.0000009E+01 | 0.0000000E+00 | 1.7629306E−01 | 4.5833825E−01 | −1.8713456E+00 |
| 6 | −6.0216677E−01 | 0.0000000E+00 | −2.3146859E−01 | 2.0546312E+00 | −8.4140570E+00 |
| 7 | −3.6129815E+00 | 0.0000000E+00 | −1.0722291E+00 | 2.2559092E+00 | −2.0209435E+00 |
| 8 | 1.0000000E+01 | 0.0000000E+00 | −9.7215398E−02 | 2.0794170E+00 | −9.7204062E+00 |
| 9 | −1.4956909E+00 | 0.0000000E+00 | −3.3467284E−01 | 3.0684809E−01 | −1.4952634E−01 |
| 10 | −1.9498620E+00 | 0.0000000E+00 | 9.4319987E−02 | −2.8588467E−01 | 7.7074080E−01 |
| 11 | 2.9375442E+00 | 0.0000000E+00 | 1.3476585E−02 | −1.0217624E−02 | 5.0978785E−02 |

| | A7 | A8 | A9 | A10 | A11 |
|---|---|---|---|---|---|
| 2 | 3.1252559E+00 | −4.4461249E+01 | 1.1932749E+02 | −1.5639909E+02 | 1.0397295E+02 |
| 3 | 1.3095130E+01 | −3.4791929E+01 | 5.4145477E+01 | −4.9731362E+01 | 2.5199275E+01 |
| 4 | −5.6789120E+00 | 3.3811153E+01 | −6.7920503E+01 | 7.2086228E+01 | −3.9926134E+01 |
| 5 | 5.3387048E+00 | −1.2492119E+01 | 2.0599903E+01 | −2.1639648E+01 | 1.2983465E+01 |
| 6 | 2.5504013E+01 | −5.3220552E+01 | 7.3436554E+01 | −6.2874972E+01 | 2.9938998E+01 |
| 7 | 1.4665871E+00 | −4.2523862E+00 | 1.0190754E+01 | −1.1481348E+01 | 6.1400542E+00 |
| 8 | 2.2180122E+01 | −2.9946842E+01 | 2.5155350E+01 | −1.2919475E+01 | 3.7012619E+00 |
| 9 | 2.3593894E−01 | −3.3065810E−01 | 2.2115426E−01 | −6.7496931E−02 | 2.6273363E−03 |
| 10 | −1.5423801E+00 | 1.8692291E+00 | −1.3752078E+00 | 6.1009383E−01 | −1.5076183E−01 |
| 11 | −2.5906706E−01 | 3.8554666E−01 | −2.8375561E−01 | 1.1478965E−01 | −2.4436764E−02 |

TABLE 4-continued

Example 2: Aspherical Surface Data

A12

| | |
|---|---|
| 2 | −2.8152748E+01 |
| 3 | −5.5080569E+00 |
| 4 | 9.0584398E+00 |
| 5 | −3.3490428E+00 |
| 6 | −6.0333231E+00 |
| 7 | −1.2799898E+00 |
| 8 | −4.5135214E−01 |
| 9 | 2.3401424E−03 |
| 10 | 1.5957035E−02 |
| 11 | 2.1344309E−03 |

TABLE 5

Example 3
f = 3.91, Bf = 1.11, Fno. = 2.39, 2ω = 76.0

| Si | Ri | Di | Ndj | νdj |
|---|---|---|---|---|
| 1(St) | ∞ | 0.1000 | | |
| *2 | 2.1485 | 0.6718 | 1.54488 | 54.87 |
| *3 | −2.9464 | 0.1038 | | |
| *4 | −3.8644 | 0.2500 | 1.63351 | 23.63 |
| *5 | 67.0461 | 0.6481 | | |
| *6 | −0.9819 | 0.3828 | 1.54488 | 54.87 |
| *7 | −0.7297 | 0.1098 | | |
| *8 | −5.7341 | 0.5500 | 1.63351 | 23.63 |
| *9 | −22.1170 | 0.3071 | | |
| *10 | −3.2067 | 0.5129 | 1.54488 | 54.87 |
| *11 | 4.5673 | 0.5000 | | |
| 12 | ∞ | 0.2100 | 1.51680 | 64.20 |
| 13 | ∞ | 0.4666 | | |
| 14(IMG) | ∞ | | | |

*aspherical surface

TABLE 6

Example 3: Aspherical Surface Data

| Surface Number | KA | A3 | A4 | A5 | A6 |
|---|---|---|---|---|---|
| 2 | 1.6736945E+00 | 0.0000000E+00 | 5.5691212E−02 | −1.1813677E+00 | 3.3705757E+00 |
| 3 | −8.8317369E+00 | 0.0000000E+00 | −1.4398494E−01 | 1.7153404E−01 | −2.6659100E+00 |
| 4 | 1.2359579E+01 | 0.0000000E+00 | −9.7403609E−02 | 1.5532103E+00 | −2.6890554E+00 |
| 5 | −1.0000009E+01 | 0.0000000E+00 | 1.5700072E−01 | 4.7557808E−01 | −1.9544068E+00 |
| 6 | −6.3443532E−01 | 0.0000000E+00 | −2.8737317E−01 | 2.0287091E+00 | −8.1749895E+00 |
| 7 | −3.5284237E+00 | 0.0000000E+00 | −1.1025262E+00 | 2.3730234E+00 | −2.1434266E+00 |
| 8 | 6.8254167E+00 | 0.0000000E+00 | −2.7430453E−02 | 2.4867637E+00 | −1.1841763E+01 |
| 9 | 1.0000009E+01 | 0.0000000E+00 | −2.7271024E−01 | 3.6141825E−01 | −2.4925077E−01 |
| 10 | −1.6986329E+00 | 0.0000000E+00 | 9.1815632E−02 | −2.3923120E−01 | 6.5680642E−01 |
| 11 | 2.1059426E+00 | 0.0000000E+00 | 3.8702606E−03 | −1.7551223E−02 | 5.4919685E−02 |

| | A7 | A8 | A9 | A10 | A11 |
|---|---|---|---|---|---|
| 2 | 3.0724403E+00 | −4.4108786E+01 | 1.1812256E+02 | −1.5452356E+02 | 1.0261556E+02 |
| 3 | 1.3128732E+00 | −3.4905368E+01 | 5.4446649E+01 | −5.0083178E+01 | 2.5355073E+01 |
| 4 | −5.7488144E+00 | 3.4214938E+01 | −6.8854274E+01 | 7.3186655E+01 | −4.0588481E+01 |
| 5 | 5.6811847E+00 | −1.3397146E+01 | 2.2264432E+01 | −2.3593007E+01 | 1.4281209E+01 |
| 6 | 2.5128564E+01 | −5.2527822E+01 | 7.2129471E+01 | −6.1502473E+01 | 2.9263832E+01 |
| 7 | 1.5289185E+00 | −4.5347954E+00 | 1.1008287E+01 | −1.2491082E+01 | 6.7293430E+00 |
| 8 | 2.7538798E+01 | −3.8337606E+01 | 3.3330205E+01 | −1.7684486E+01 | 5.2121189E+00 |
| 9 | 2.7182167E−01 | −3.5920902E−01 | 2.7290731E−01 | −9.5661080E−02 | 3.4256749E−03 |
| 10 | −1.2831843E+00 | 1.5054535E+00 | −1.0775925E+00 | 4.6633239E−01 | −1.1223978E−01 |
| 11 | −2.5264825E−01 | 3.7772497E−01 | −2.7884123E−01 | 1.1257599E−01 | −2.3849745E−02 |

| | A12 |
|---|---|
| 2 | −2.7771488E+01 |
| 3 | −5.5176755E+00 |
| 4 | 9.2224808E+00 |
| 5 | −3.7142077E+00 |
| 6 | −5.9139974E+00 |
| 7 | −1.4161463E+00 |
| 8 | −6.5097887E−01 |
| 9 | 4.2748545E−03 |
| 10 | 1.1519649E−02 |
| 11 | 2.0724113E−03 |

TABLE 7

Example 4
f = 3.92, Bf = 0.94, Fno. = 2.40, 2ω = 75.6

| Si | Ri | Di | Ndj | νdj |
|---|---|---|---|---|
| 1(St) | ∞ | 0.0912 | | |
| *2 | 2.0719 | 0.7066 | 1.54488 | 54.87 |
| *3 | −2.7692 | 0.1152 | | |
| *4 | −3.9616 | 0.2536 | 1.63351 | 23.63 |
| *5 | 55.4024 | 0.4744 | | |
| *6 | −1.4890 | 0.6500 | 1.54488 | 54.87 |
| *7 | −0.8810 | 0.1321 | | |
| *8 | −3.1607 | 0.5500 | 1.63351 | 23.63 |
| *9 | −35.0067 | 0.4131 | | |
| *10 | −2.7120 | 0.3908 | 1.54488 | 54.87 |
| *11 | 6.4352 | 0.5000 | | |
| 12 | ∞ | 0.2100 | 1.51680 | 64.20 |
| 13 | ∞ | 0.3012 | | |
| 14(IMG) | ∞ | | | |

*aspherical surface

TABLE 8

Example 4: Aspherical Surface Data

| Surface Number | KA | A3 | A4 | A5 | A6 |
|---|---|---|---|---|---|
| 2 | 1.3256719E+00 | 0.0000000E+00 | 9.9124578E−03 | −5.8404949E−01 | 1.7769797E+00 |
| 3 | −3.9053459E+00 | 0.0000000E+00 | −7.5717832E−02 | −3.2105028E−01 | 9.1489087E−01 |
| 4 | 1.2649385E+01 | 0.0000000E+00 | −3.6344584E−02 | 1.7870334E+00 | −5.8760299E+00 |
| 5 | −1.0000000E+00 | 0.0000000E+00 | 1.4345379E−01 | 1.1705076E+00 | −5.2641355E+00 |
| 6 | −4.2123804E−01 | 0.0000000E+00 | −1.2603436E−01 | 1.0866521E+00 | −2.3051618E+00 |
| 7 | −4.4800336E+00 | 0.0000000E+00 | −7.8924749E−01 | 2.2349144E+00 | −3.1571499E+00 |
| 8 | 2.5088378E+00 | 0.0000000E+00 | 2.2956737E−01 | −1.7153483E−01 | 5.2378229E−02 |
| 9 | −6.2504606E+00 | 0.0000000E+00 | −2.0935998E−01 | −5.9273396E−02 | 8.0142551E−01 |
| 10 | −2.2402741E+00 | 0.0000000E+00 | −4.0997010E−03 | −1.1382559E−01 | 1.5314789E−01 |
| 11 | 5.4252416E+00 | 0.0000000E+00 | 2.9774264E−02 | −1.2896055E−01 | 1.1727498E−01 |

| | A7 | A8 | A9 | A10 | A11 |
|---|---|---|---|---|---|
| 2 | −2.6400193E+00 | 7.3580707E−01 | 2.1091211E+00 | −2.3664605E+00 | 7.0663932E−01 |
| 3 | −1.4575620E+00 | −4.8061960E−01 | 4.7426552E+00 | −6.2118410E+00 | 3.4148570E+00 |
| 4 | 8.8465748E+00 | −6.1547220E+00 | −3.0428948E−01 | 4.5381376E+00 | −3.5008754E+00 |
| 5 | 1.2664993E+01 | −1.9411142E+01 | 1.8985634E+01 | −1.1403541E+01 | 4.0963210E+00 |
| 6 | 2.9717570E+00 | −2.2364469E+00 | 8.0153599E−01 | 6.3909731E−02 | −1.2072863E−01 |
| 7 | 2.8237182E+00 | −1.4196678E+00 | 6.7721117E−02 | 4.4627562E−01 | −2.5775390E−01 |
| 8 | −2.9391561E−01 | 4.3668994E−01 | −2.1877403E−01 | 2.0449915E−02 | 7.5227574E−03 |
| 9 | −1.1476997E+00 | 7.0536763E−01 | −1.1846172E−01 | −7.9126616E−02 | 3.8433951E−02 |
| 10 | −3.6470848E−02 | −4.4826835E−02 | 2.8455702E−02 | −3.5427034E−03 | −4.1434218E−04 |
| 11 | −4.7066597E−02 | 2.9548640E−03 | 3.8116928E−03 | −1.3104277E−03 | 2.8701374E−04 |

| | A12 |
|---|---|
| 2 | −4.5347787E−02 |
| 3 | −7.2314890E−01 |
| 4 | 8.8952159E−01 |
| 5 | −7.6611785E−01 |
| 6 | 4.6889356E−03 |
| 7 | 3.8372130E−02 |
| 8 | −1.0202783E−03 |
| 9 | −4.1245500E−03 |
| 10 | −2.1412682E−05 |
| 11 | −5.0810402E−05 |

TABLE 9

Example 5
f = 3.87, Bf = 0.98, Fno. = 2.40, 2ω = 76.0

| Si | Ri | Di | Ndj | νdj |
|---|---|---|---|---|
| 1(St) | ∞ | 0.0828 | | |
| *2 | 2.0881 | 0.6793 | 1.54488 | 54.87 |
| *3 | −2.8601 | 0.0998 | | |
| *4 | −3.9828 | 0.2501 | 1.63351 | 23.63 |
| *5 | 70.8260 | 0.5741 | | |
| *6 | −0.9055 | 0.4262 | 1.54488 | 54.87 |
| *7 | −0.7275 | 0.2148 | | |
| *8 | −10.3044 | 0.5500 | 1.63351 | 23.63 |
| *9 | 4.1241 | 0.3726 | | |
| *10 | −5.4045 | 0.4992 | 1.54488 | 54.87 |
| *11 | 36.3812 | 0.5000 | | |
| 12 | ∞ | 0.2100 | 1.51680 | 64.20 |
| 13 | ∞ | 0.3375 | | |
| 14(IMG) | ∞ | | | |

*aspherical surface

TABLE 10

Example 5: Aspherical Surface Data

| Surface Number | KA | A3 | A4 | A5 | A6 |
|---|---|---|---|---|---|
| 2 | 1.0008191E+00 | 0.0000000E+00 | 4.6722147E−02 | −1.1611541E+00 | 3.3737170E+00 |
| 3 | −4.7127139E+00 | 0.0000000E+00 | −1.1761086E−01 | 1.5519716E−01 | −2.6817037E+00 |
| 4 | 1.3270702E+01 | 0.0000000E+00 | −6.6900820E−02 | 1.5318569E+00 | −2.7867029E+00 |
| 5 | −1.0000009E+01 | 0.0000000E+00 | 1.6855064E−01 | 4.9221014E−01 | −1.9699231E+00 |
| 6 | −5.2194916E−01 | 0.0000000E+00 | −2.2576245E−01 | 2.0786067E+00 | −8.6724175E+00 |
| 7 | −3.6051858E+00 | 0.0000000E+00 | −1.1912378E+00 | 2.5214943E+00 | −2.1863501E+00 |
| 8 | −9.9896263E+00 | 0.0000000E+00 | −7.1715498E−02 | 2.3422079E+00 | −1.1099582E+01 |
| 9 | −4.5031772E+00 | 0.0000000E+00 | −3.4114623E−01 | 2.7582806E−01 | −1.0745595E−01 |
| 10 | −3.1565915E+00 | 0.0000000E+00 | 3.7146643E−02 | −2.0594692E−01 | 5.6228917E−01 |
| 11 | −1.0000009E+01 | 0.0000000E+00 | 6.1422362E−02 | −1.7722568E−02 | 1.6522995E−02 |

| | A7 | A8 | A9 | A10 | A11 |
|---|---|---|---|---|---|
| 2 | 3.0290762E+00 | −4.3400857E+01 | 1.1554144E+02 | −1.5066088E+02 | 9.9922254E+01 |
| 3 | 1.2871593E+01 | −3.3941262E+01 | 5.2886878E+01 | −4.8595585E+01 | 2.4509128E+01 |
| 4 | −5.6979842E+00 | 3.4144571E+01 | −6.8252484E+01 | 7.2332798E+01 | −4.0157654E+01 |
| 5 | 5.4498915E+00 | −1.2724336E+01 | 2.1218812E+01 | −2.2417555E+01 | 1.3469769E+01 |
| 6 | 2.6253256E+01 | −5.4769626E+01 | 7.5913273E+01 | −6.5372217E+01 | 3.1264227E+01 |
| 7 | 1.5858620E+00 | −5.0666119E+00 | 1.2174442E+01 | −1.3818543E+01 | 7.5526178E+00 |
| 8 | 2.5717494E+01 | −3.5480981E+01 | 3.0512748E+01 | −1.6022740E+01 | 4.6783367E+00 |
| 9 | 2.0901929E−01 | −2.9289515E−01 | 1.8208210E−01 | −5.2279641E−02 | 2.3138949E−03 |
| 10 | −1.0325426E+00 | 1.1739396E+00 | −8.1797071E−01 | 3.4352798E−01 | −8.0022331E−02 |
| 11 | −1.7462912E−01 | 2.5281878E−01 | −1.7237769E−01 | 6.5324146E−02 | −1.3301887E−02 |

| | A12 |
|---|---|
| 2 | −2.7042508E+01 |
| 3 | −5.2976748E+00 |
| 4 | 9.1569466E+00 |
| 5 | −3.4712626E+00 |
| 6 | −6.3088278E+00 |
| 7 | −1.6307936E+00 |
| 8 | −5.7863736E−01 |
| 9 | 1.6192282E−03 |
| 10 | 7.9333830E−03 |
| 11 | 1.1298307E−03 |

TABLE 11

Example 6
f = 3.95, Bf = 1.02, Fno. = 2.40, 2ω = 75.2

| Si | Ri | Di | Ndj | vdj |
|---|---|---|---|---|
| 1(St) | ∞ | 0.0000 | | |
| *2 | 1.9390 | 0.6893 | 1.54488 | 54.87 |
| *3 | −3.5746 | 0.0999 | | |
| *4 | −6.2191 | 0.2500 | 1.63351 | 23.63 |
| *5 | 7.9919 | 0.5595 | | |
| *6 | −1.0892 | 0.5146 | 1.54488 | 54.87 |
| *7 | −0.8520 | 0.2423 | | |
| *8 | −29.1286 | 0.5500 | 1.63351 | 23.63 |
| *9 | 4.9895 | 0.4839 | | |
| *10 | −3.6571 | 0.2500 | 1.54488 | 54.87 |
| *11 | 239.3851 | 0.5000 | | |
| 12 | ∞ | 0.2100 | 1.51680 | 64.20 |
| 13 | ∞ | 0.3762 | | |
| 14(IMG) | ∞ | | | |

*aspherical surface

TABLE 12

Example 6: Aspherical Surface Data

| Surface Number | KA | A3 | A4 | A5 | A6 |
|---|---|---|---|---|---|
| 2 | 7.7695498E−01 | 0.0000000E+00 | −2.9551077E−02 | 1.0309419E−01 | −6.5677972E−01 |
| 3 | 6.9942238E+00 | 0.0000000E+00 | −1.2440554E−01 | −1.5518575E−01 | −1.6129845E−01 |
| 4 | 1.3233602E+01 | 0.0000000E+00 | −2.3948928E−02 | 1.1180756E+00 | −2.8767166E+00 |
| 5 | −1.0000009E+01 | 0.0000000E+00 | 1.9247044E−01 | 1.7546528E−01 | −4.4298715E−01 |
| 6 | −1.0940725E+00 | 0.0000000E+00 | 8.4326317E−02 | −3.1517586E−01 | 5.5200980E−01 |
| 7 | −4.4557960E+00 | 0.0000000E+00 | −7.5190150E−01 | 1.3976994E+00 | −1.3659622E+00 |
| 8 | 1.0000000E+00 | 0.0000000E+00 | 2.9381315E−01 | −7.3617988E−01 | 6.9382940E−01 |
| 9 | −1.3081527E+00 | 0.0000000E+00 | −1.8579859E−01 | −9.0922748E−03 | 2.1025333E−01 |
| 10 | −9.9845752E+00 | 0.0000000E+00 | −6.9022574E−03 | −1.1406980E−02 | 1.6879426E−02 |
| 11 | 1.0000009E+01 | 0.0000000E+00 | 5.8788100E−02 | −3.0349591E−02 | −3.0283720E−02 |

TABLE 12-continued

Example 6: Aspherical Surface Data

|   | A7 | A8 |
|---|---|---|
| 2 | 1.0258594E+00 | −6.5801447E−01 |
| 3 | 3.6931689E−01 | −1.9957325E−01 |
| 4 | 2.7663494E+00 | −8.5856217E−01 |
| 5 | 1.7977885E−01 | 9.3567029E−02 |
| 6 | −2.0309132E−01 | −4.6908247E−02 |
| 7 | 9.4719883E−01 | −2.9921746E−01 |
| 8 | −2.9055421E−01 | 3.9192512E−02 |
| 9 | −1.4007642E−01 | 2.7002884E−02 |
| 10 | −4.2448075E−03 | 7.6853111E−05 |
| 11 | 2.3286558E−02 | −4.1204174E−03 |

TABLE 13

Values Related to Conditional Formulae

| Formula | Condition | Example 1 | Example 2 | Example 3 | Example 4 | Example 5 | Example 6 |
|---|---|---|---|---|---|---|---|
| 1 | f/f4 | −0.45 | −0.57 | −0.32 | −0.71 | −0.84 | −0.59 |
| 2 | f/f5 | −0.99 | −0.89 | −1.16 | −1.14 | −0.45 | −0.60 |
| 3 | f · P34 | 2.78 | 2.84 | 2.52 | 1.70 | 2.70 | 2.46 |
| 4 | f · P45 | −0.81 | −1.18 | −0.55 | −0.71 | −1.01 | −1.13 |
| 5 | (L2r + L2f)/(L2r − L2f) | 0.098 | 0.981 | 0.891 | 0.867 | 0.894 | 0.125 |
| 6 | f · tanω/L5r | 0.55 | 0.41 | 0.67 | 0.47 | 0.08 | 0.01 |
| 7 | f/f1 | 1.73 | 1.61 | 1.64 | 1.71 | 1.66 | 1.64 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number vd with respect to the d line is obtained by calculations, substituting the values of Nd, NF, and NC obtained by the above measurements into the formula below.

$$vd=(Nd-1)/(NF-NC)$$

What is claimed is:

1. An imaging lens consisting essentially of five lenses, including:
   a first lens having a positive refractive power and a convex surface toward the object side;
   a second lens of a biconcave shape;
   a third lens having a positive refractive power and is of a meniscus shape with a concave surface toward the object side;
   a fourth lens having a negative refractive power and a concave surface toward the object side; and a fifth lens having a negative refractive power and a concave surface toward the image side, provided in this order from the object side;

the imaging lens satisfying the following conditional formulae:

$$-1.2 < f/f4 < -0.2 \quad (1)$$

$$-1.18 < f/f5 < -0.35 \quad (2)$$

$$1.5 < f \cdot P34 < 5 \quad (3)$$

wherein f is the focal length of the entire system, f4 is the focal length of the fourth lens, and f5 is the focal length of the fifth lens, and P34 is the refractive power of an air lens formed between the surface of the third lens toward the image side and the surface of the fourth lens toward the object side, the refractive power of the air lens being obtained by Formula (P1) below:

$$P34 = \frac{1-Nd3}{L3r} + \frac{Nd4-1}{L4f} - \frac{(1-Nd3) \times (Nd4-1) \times D7}{L3r \times L4f} \quad (P1)$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis.

2. The imaging lens as defined in claim 1, wherein: the fifth lens is of a biconcave shape.

3. The imaging lens as defined claim 1, wherein: the first lens is of a biconvex shape.

4. The imaging lens as defined in claim 1 that further satisfies the following conditional formula:

$$-2 < f \cdot P45 < 1.1 \quad (4)$$

wherein P45 is the refractive power of an air lens formed between the surface of the fourth lens toward the image side and the surface of the fifth lens toward the object side, the refractive power of the air lens being obtained by Formula (P2) below:

$$P45 = \frac{1-Nd4}{L4r} + \frac{Nd5-1}{L5f} - \frac{(1-Nd4) \times (Nd5-1) \times D9}{L4r \times L5f} \quad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

5. The imaging lens as defined in claim 1 that further satisfies the following conditional formula:

$$0.08 < (L2r+L2f)/(L2r-L2f) < 1 \quad (5)$$

wherein L2r is the paraxial radius of curvature of the surface of the second lens toward the image side, and L2f is the paraxial radius of curvature of the surface of the second lens toward the object side.

6. The imaging lens as defined in claim 1 that further satisfies the following conditional formula:

$$0 < f \cdot \tan \omega / L5r < 0.7 \quad (6)$$

wherein L5r is the paraxial radius of curvature of the surface of the fifth lens toward the object side, and ω is the half value of a maximum angle of view when focused on an object at infinity.

7. The imaging lens as defined in claim 1 that further satisfies the following conditional formula:

$$1 < f/f1 < 3 \quad (7)$$

wherein f1 is the focal length of the first lens.

8. The imaging lens as defined in claim 1 that further satisfies the following conditional formula:

$$-1 < f/f4 < -0.25 \quad (1\text{-}1).$$

9. The imaging lens as defined in claim 1 that further satisfies the following conditional formula:

$$-1.17 < f/f5 < -0.44 \quad (2\text{-}1).$$

10. The imaging lens as defined in claim 1 that further satisfies the following conditional formula:

$$1.6 < f \cdot P34 < 4 \quad (3\text{-}1)$$

wherein P34 is the refractive power of an air lens formed between the surface of the third lens toward the image side and the surface of the fourth lens toward the object side, the refractive power of the air lens being obtained by Formula (P1) below:

$$P34 = \frac{1-Nd3}{L3r} + \frac{Nd4-1}{L4f} - \frac{(1-Nd3) \times (Nd4-1) \times D7}{L3r \times L4f} \quad (P1)$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis.

11. The imaging lens as defined in claim 1 that further satisfies the following conditional formula:

$$-1.5 < f \cdot P45 < 0 \quad (4\text{-}1)$$

wherein P45 is the refractive power of an air lens formed between the surface of the fourth lens toward the image side and the surface of the fifth lens toward the object side, the refractive power of the air lens being obtained by Formula (P2) below:

$$P45 = \frac{1-Nd4}{L4r} + \frac{Nd5-1}{L5f} - \frac{(1-Nd4) \times (Nd5-1) \times D9}{L4r \times L5f} \quad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

12. The imaging lens as defined in claim 1 that further satisfies the following conditional formula:

$$0.09 < (L2r+L2f)/(L2r-L2f) < 0.99 \quad (5\text{-}1)$$

wherein L2r is the paraxial radius of curvature of the surface of the second lens toward the image side, and L2f is the paraxial radius of curvature of the surface of the second lens toward the object side.

13. The imaging lens as defined in claim 1 that further satisfies the following conditional formula:

$$-0.85 < f/f4 < -0.3 \quad (1\text{-}2).$$

14. The imaging lens as defined in claim 1 that further satisfies the following conditional formula:

$$2.4 < f \cdot P34 < 3 \quad (3\text{-}2)$$

wherein P34 is the refractive power of an air lens formed between the surface of the third lens toward the image side and the surface of the fourth lens toward the object side, the refractive power of the air lens being obtained by Formula (P1) below:

$$P34 = \frac{1-Nd3}{L3r} + \frac{Nd4-1}{L4f} - \frac{(1-Nd3) \times (Nd4-1) \times D7}{L3r \times L4f} \quad (P1)$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis.

15. The imaging lens as defined in claim 1 that further satisfies the following conditional formula:

$$-1.2 < f \cdot P45 < -0.5 \quad (4\text{-}2)$$

wherein P45 is the refractive power of an air lens formed between the surface of the fourth lens toward the image side and the surface of the fifth lens toward the object side, the refractive power of the air lens being obtained by Formula (P2) below:

$$P45 = \frac{1-Nd4}{L4r} + \frac{Nd5-1}{L5f} - \frac{(1-Nd4) \times (Nd5-1) \times D9}{L4r \times L5f} \quad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

16. The imaging lens as defined in claim 1 that further satisfies the following conditional formula:

$$0.1 < (L2r+L2f)/(L2r-L2f) < 0.985 \quad (5\text{-}2)$$

wherein L2r is the paraxial radius of curvature of the surface of the second lens toward the image side, and L2f is the paraxial radius of curvature of the surface of the second lens toward the object side.

17. An imaging apparatus equipped with an imaging lens as defined in Claim 1.

18. An imaging lens consisting essentially of five lenses, including:
   a first lens having a positive refractive power and a convex surface toward the object side;
   a second lens of a biconcave shape;
   a third lens having a positive refractive power and is of a meniscus shape with a concave surface toward the object side;
   a fourth lens having a negative refractive power and a concave surface toward the object side; and
   a fifth lens having a negative refractive power and a concave surface toward the image side, provided in this order from the object side;
   the imaging lens satisfying the following conditional formulae:

$$-1.2 < f/f4 < -0.2 \quad (1)$$

$$-1.18 < f/f5 < -0.35 \quad (2)$$

wherein f is the focal length of the entire system, f4 is the focal length of the fourth lens, and f5 is the focal length of the fifth lens, and
   the fourth lens is of a biconcave shape.

19. An imaging lens consisting essentially of five lenses, including:
   a first lens having a positive refractive power and a convex surface toward the object side;
   a second lens of a biconcave shape;
   a third lens having a positive refractive power and is of a meniscus shape with a concave surface toward the object side;
   a fourth lens having a negative refractive power and a concave surface toward the object side; and
   a fifth lens having a negative refractive power and a concave surface toward the image side, provided in this order from the object side;
   the imaging lens satisfying the following conditional formulae:

$$-1.2 < f/f4 < -0.2 \quad (1)$$

$$-1.18 < f/f5 < -0.35 \quad (2)$$

wherein f is the focal length of the entire system, f4 is the focal length of the fourth lens, and f5 is the focal length of the fifth lens, and that further satisfies the following conditional formula:

$$-1.1 < f/f5 < -0.7 \quad (2\text{-}2).$$

* * * * *